United States Patent
Ibrahim et al.

(10) Patent No.: US 11,917,668 B2
(45) Date of Patent: Feb. 27, 2024

(54) SIGNALING FOR INTER-BASE STATION INTERFERENCE ESTIMATION

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Huilin Xu, Temecula, CA (US); Ahmed Attia Abotabl, San Diego, CA (US); Seyedkianoush Hosseini, San Diego, CA (US); Wanshi Chen, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 236 days.

(21) Appl. No.: 17/567,723

(22) Filed: Jan. 3, 2022

(65) Prior Publication Data
US 2023/0217477 A1 Jul. 6, 2023

(51) Int. Cl.
*H04L 12/26* (2006.01)
*H04W 72/541* (2023.01)

(52) U.S. Cl.
CPC .............................. *H04W 72/541* (2023.01)

(58) Field of Classification Search
CPC ........... H04W 72/541; H04W 56/0045; H04W 24/08; H04W 52/146; H04L 5/0012; H04B 7/0695
See application file for complete search history.

(56) References Cited

U.S. PATENT DOCUMENTS

2017/0171865 A1* 6/2017 Hwang ................. H04B 1/713

FOREIGN PATENT DOCUMENTS

| EP | 3393069 A1 * | 10/2018 | ......... H04L 27/2602 |
| TW | 202110109 A * | 3/2021 | ............. H04B 7/024 |
| WO | WO-2009070930 A1 * | 6/2009 | ............ H04W 72/00 |

(Continued)

OTHER PUBLICATIONS

M. S. ElBamby, M. Bennis, W. Saad and M. Latva-aho, "Dynamic uplink-downlink optimization in TDD-based small cell networks," 2014 11th International Symposium on Wireless Communications Systems (ISWCS), Barcelona, Spain, 2014, pp. 939-944, doi: 10.1109/ISWCS.2014.6933488. (Year: 2014).*

(Continued)

*Primary Examiner* — Thai D Hoang
(74) *Attorney, Agent, or Firm* — Holland & Hart LLP

(57) ABSTRACT

Methods, systems, and devices for wireless communications are described. A user equipment (UE) may receive a message indicating one or more communication patterns from a base station. The one or more communication patterns may indicate to the UE to adjust one or more parameters for transmitting an uplink communication during a set of time resources, a set of beams, a set of ports, or any combination thereof. During the resources indicated in the one or more communication patterns, the base station may estimate a cross-link interference channel between the base station and a second base station. The one or more communication patterns may indicate a hopping pattern for each subband of a bandwidth part. The base station may configure the UE with a timing advance based on the message.

30 Claims, 18 Drawing Sheets

(56) References Cited

FOREIGN PATENT DOCUMENTS

| | | | | |
|---|---|---|---|---|
| WO | WO-2019212503 A1 | * | 11/2019 | |
| WO | WO-2021141700 A1 | * | 7/2021 | ............. H04B 1/713 |

OTHER PUBLICATIONS

A. Tibhirt, D. Slock and Y. Yuan-Wu, "Distributed Beamforming Design in Reduced-Rank MIMO Interference Channels and Application to Dynamic TDD," WSA 2021; 25th International ITG Workshop on Smart Antennas, French Riviera, France, 2021, pp. 1-6. (Year: 2022).*

A. Tibhirt, D. Slock and Y. Yuan-Wu, "Interference Alignment in Reduced-Rank MIMO Networks with Application to Dynamic TDD," 2022 20th International Symposium on Modeling and Optimization in Mobile, Ad hoc, and Wireless Networks (WiOpt), Torino, Italy, 2022, pp. 338-344, doi: 10.23919/WiOpt56218.2022. (Year: 2022).*

A. Tibhirt, D. Slock and Y. Yuan-Wu, "Beamforming for Reduced-Rank MIMO Interference Channels in Dynamic TDD Systems," 2023 Fourteenth International Conference on Ubiquitous and Future Networks (ICUFN), Paris, France, 2023, pp. 145-150, doi: 10.1109/ICUFN57995.2023.10200006. (Year: 2023).*

* cited by examiner

SIGNALING FOR INTER-BASE STATION INTERFERENCE ESTIMATION

FIELD OF TECHNOLOGY

The following relates to wireless communication, including signaling for inter-base station interference estimation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support signaling for inter-base station interference estimation. Generally, the described techniques provide for measuring interference for full duplex communications. For example, the techniques enable a base station to estimate a cross-link interference (CLI) channel between a first base station and a second base station. Estimating the CLI channel may enable the first base station to mitigate interference between uplink channels and the CLI channel. For example, a user equipment (UE) may receive a message indicating one or more communication patterns from the first base station. In some cases, the one or more communication patterns may indicate to the UE to adjust a parameter (e.g., wait, use a reduced transmit power, mute, timing advance (TA)) for transmitting an uplink communication during a set of time resources, a set of beams, a set of ports, or any combination thereof. During the resources indicated in the one or more communication patterns, the first base station may estimate the CLI channel between the first base station and the second base station. The first base station may then use the estimated CLI channel to improve the reception of uplink communications during full duplex scenarios. In some cases, the one or more communication patterns may indicate a hopping pattern. The hopping pattern may indicate each subband of a bandwidth part (BWP) that the base station may use to estimate the CLI channel for at least one time resource. In some cases, the base station may configure the UE with a TA based on the message. In some examples, the base station may use one or more types of resources (e.g., a downlink resource or a flexible resource converted to a downlink resource) for measuring CLI.

A method for wireless communication at a UE is described. The method may include receiving, from a first base station, a message that indicates one or more communication patterns of one or more resources for estimating a CLI channel between uplink communications associated with the first base station and downlink communications associated with a second base station, adjusting a transmission parameter for an uplink communication based on receiving the message from the first base station, and transmitting the uplink communication over the one or more resources based on adjusting the transmission parameter.

An apparatus for wireless communication at a UE is described. The apparatus may include a processor, memory coupled with the processor, and instructions stored in the memory. The instructions may be executable by the processor to cause the apparatus to receive, from a first base station, a message that indicates one or more communication patterns of one or more resources for estimating a CLI channel between uplink communications associated with the first base station and downlink communications associated with a second base station, adjust a transmission parameter for an uplink communication based on receiving the message from the first base station, and transmit the uplink communication over the one or more resources based on adjusting the transmission parameter.

Another apparatus for wireless communication at a UE is described. The apparatus may include means for receiving, from a first base station, a message that indicates one or more communication patterns of one or more resources for estimating a CLI channel between uplink communications associated with the first base station and downlink communications associated with a second base station, means for adjusting a transmission parameter for an uplink communication based on receiving the message from the first base station, and means for transmitting the uplink communication over the one or more resources based on adjusting the transmission parameter.

A non-transitory computer-readable medium storing code for wireless communication at a UE is described. The code may include instructions executable by a processor to receive, from a first base station, a message that indicates one or more communication patterns of one or more resources for estimating a CLI channel between uplink communications associated with the first base station and downlink communications associated with a second base station, adjust a transmission parameter for an uplink communication based on receiving the message from the first base station, and transmit the uplink communication over the one or more resources based on adjusting the transmission parameter.

Some examples of the method, apparatuses, and non-transitory computer-readable medium described herein may further include operations, features, means, or instructions for receiving, from the first base station, a second message to activate a communication pattern of the one or more communication patterns, where adjusting a transmission parameter for the uplink communication may be based on receiving the second message.

In some examples of the method, apparatuses, and non-transitory computer-readable medium described herein, the message includes a radio resource control message and the second message includes a medium access control-control element or downlink control information.

In some examples of the method, apparatuses, and non-transitory computer-readable medium described herein, adjusting the transmission parameter for the uplink communication may include operations, features, means, or instructions for reducing the transmit power of the uplink communications during at least a portion of the one or more resources.

In some examples of the method, apparatuses, and non-transitory computer-readable medium described herein, reducing the transmit power of the uplink communications may include operations, features, means, or instructions for reducing the transmit power of the uplink communications to zero during the portion of the one or more resources.

Some examples of the method, apparatuses, and non-transitory computer-readable medium described herein may further include operations, features, means, or instructions for identifying a first subband of a BWP for estimating the CLI channel, a second subband of the BWP for a second uplink communication by the UE, and a third subband of the BWP as a guard band between the first subband and the second subband based on receiving the message, the one or more resources including the BWP, where the one or more communication patterns included in the message indicate the first subband, the second subband, and the third subband, where adjusting a transmission parameter for the uplink communication may be based on the identifying.

Some examples of the method, apparatuses, and non-transitory computer-readable medium described herein may further include operations, features, means, or instructions for transmitting, over the second subband, the uplink communication to the first base station based on transmitting the message.

Some examples of the method, apparatuses, and non-transitory computer-readable medium described herein may further include operations, features, means, or instructions for identifying a hopping pattern of subbands of a BWP for estimating the CLI channel and transmitting the uplink communications based on receiving the message, the hopping pattern spanning a set of multiple slots, where the one or more communication patterns indicate the hopping pattern, where adjusting a transmission parameter for the uplink communication may be based on the identifying.

In some examples of the method, apparatuses, and non-transitory computer-readable medium described herein, the hopping pattern indicates at least one time resource for each subband of the subbands of the BWP for estimating the CLI channel.

In some examples of the method, apparatuses, and non-transitory computer-readable medium described herein, adjusting the transmission parameter for the uplink communication may include operations, features, means, or instructions for applying a TA for the uplink communication transmitted by the UE during a first time resource of the one or more resources based on receiving the message, the TA based on a propagation delay of a downlink communication transmitted by the second base station.

In some examples of the method, apparatuses, and non-transitory computer-readable medium described herein, the TA may be based on a capability of the UE.

In some examples of the method, apparatuses, and non-transitory computer-readable medium described herein, adjusting the transmission parameter for the uplink communication may include operations, features, means, or instructions for identifying one or more beams to restrict the UE from using to transmit the uplink communication during the one or more resources, where the message indicates the one or more beams.

Some examples of the method, apparatuses, and non-transitory computer-readable medium described herein may further include operations, features, means, or instructions for receiving, from the first base station, a second message that schedules the UE with the uplink communication using the one or more beams and determining to skip the uplink communication or use a different beam than the one or more beams based on the one or more communication patterns.

Some examples of the method, apparatuses, and non-transitory computer-readable medium described herein may further include operations, features, means, or instructions for identifying one or more subbands of frequency resources or one or more slots of time resources or both for estimating the CLI channel, where the message includes an indication of the one or more subbands or the one or more slots.

In some examples of the method, apparatuses, and non-transitory computer-readable medium described herein, the one or more resources include one or more subbands of frequency resources and one or more slots of time resources.

In some examples of the method, apparatuses, and non-transitory computer-readable medium described herein, the one or more communication patterns indicate to the UE to mute or reduce a transmit power of one or more uplink communications during a set of time resources of the one or more resources.

In some examples of the method, apparatuses, and non-transitory computer-readable medium described herein, the one or more communication patterns indicate a set of beams that the UE may be restricted from using for the uplink communications.

In some examples of the method, apparatuses, and non-transitory computer-readable medium described herein, the one or more communication patterns indicate one or more ports for estimating the CLI channel.

In some examples of the method, apparatuses, and non-transitory computer-readable medium described herein, the first base station may be configured to receive the uplink communications over the one or more resources and the second base station may be configured to transmit the downlink communications over the one or more resources.

A method for wireless communication at a first base station is described. The method may include transmitting, to a UE, a message that indicates one or more communication patterns of one or more resources for estimating a CLI channel between the first base station and a second base station, the first base station configured to receive uplink communications over the one or more resources, monitoring the one or more resources for CLI associated with the second base station based on transmitting the message, and processing a first uplink communication from the UE communicated over a resource full duplexed with one or more downlink communications associated with the second base station based on monitoring the one or more resources for the CLI.

An apparatus for wireless communication at a first base station is described. The apparatus may include a processor, memory coupled with the processor, and instructions stored in the memory. The instructions may be executable by the processor to cause the apparatus to transmit, to a UE, a message that indicates one or more communication patterns of one or more resources for estimating a CLI channel between the first base station and a second base station, the first base station configured to receive uplink communications over the one or more resources, monitor the one or more resources for CLI associated with the second base station based on transmitting the message, and process a first uplink communication from the UE communicated over a resource full duplexed with one or more downlink communications associated with the second base station based on monitoring the one or more resources for the CLI.

Another apparatus for wireless communication at a first base station is described. The apparatus may include means for transmitting, to a UE, a message that indicates one or more communication patterns of one or more resources for estimating a CLI channel between the first base station and a second base station, the first base station configured to receive uplink communications over the one or more resources, means for monitoring the one or more resources for CLI associated with the second base station based on transmitting the message, and means for processing a first uplink communication from the UE communicated over a resource full duplexed with one or more downlink communications associated with the second base station based on monitoring the one or more resources for the CLI.

A non-transitory computer-readable medium storing code for wireless communication at a first base station is described. The code may include instructions executable by a processor to transmit, to a UE, a message that indicates one or more communication patterns of one or more resources for estimating a CLI channel between the first base station and a second base station, the first base station configured to receive uplink communications over the one or more resources, monitor the one or more resources for CLI associated with the second base station based on transmitting the message, and process a first uplink communication from the UE communicated over a resource full duplexed with one or more downlink communications associated with the second base station based on monitoring the one or more resources for the CLI.

Some examples of the method, apparatuses, and non-transitory computer-readable medium described herein may further include operations, features, means, or instructions for transmitting a second message to activate a communication pattern of the one or more communication patterns, where monitoring the one or more resources for the CLI may be based on transmitting the second message.

In some examples of the method, apparatuses, and non-transitory computer-readable medium described herein, the message includes a radio resource control message and the second message includes a medium access control-control element or downlink control information.

Some examples of the method, apparatuses, and non-transitory computer-readable medium described herein may further include operations, features, means, or instructions for identifying one or more UEs to mute the uplink communications during at least a portion of the one or more resources, the one or more UEs including the first UE, where transmitting the message may be based on identifying the one or more UEs.

Some examples of the method, apparatuses, and non-transitory computer-readable medium described herein may further include operations, features, means, or instructions for identifying one or more UEs to reduce a transmit power of the uplink communications during at least a portion of the one or more resources, the one or more UEs including the first UE, where transmitting the message may be based on identifying the one or more UEs.

Some examples of the method, apparatuses, and non-transitory computer-readable medium described herein may further include operations, features, means, or instructions for identifying one or more subbands of frequency resources or one or more slots of time resources or both for estimating the CLI channel, where the message includes an indication of the one or more subbands or the one or more slots.

In some examples of the method, apparatuses, and non-transitory computer-readable medium described herein, the one or more resources include one or more subbands of frequency resources and one or more slots of time resources.

In some examples of the method, apparatuses, and non-transitory computer-readable medium described herein, the one or more communication patterns indicate to the UE to mute or reduce a transmit power of one or more uplink communications during a set of time resources of the one or more resources.

Some examples of the method, apparatuses, and non-transitory computer-readable medium described herein may further include operations, features, means, or instructions for identifying a first subband of a BWP for estimating the CLI channel, a second subband of the BWP for an uplink communication by the UE, and a third subband of the BWP as a guard band between the first subband and the second subband, the one or more resources including the BWP, where the one or more communication patterns included in the message indicate the first subband, the second subband, and the third subband.

Some examples of the method, apparatuses, and non-transitory computer-readable medium described herein may further include operations, features, means, or instructions for monitoring the one or more resources further includes monitoring the first subband of the BWP for the CLI.

Some examples of the method, apparatuses, and non-transitory computer-readable medium described herein may further include operations, features, means, or instructions for receiving, over the second subband, the uplink communication from the UE based on transmitting the message.

Some examples of the method, apparatuses, and non-transitory computer-readable medium described herein may further include operations, features, means, or instructions for identifying a hopping pattern of subbands of a BWP for estimating the CLI channel and receiving the uplink communications, the hopping pattern spanning a set of multiple slots, where the one or more communication patterns indicate the hopping pattern.

In some examples of the method, apparatuses, and non-transitory computer-readable medium described herein, the hopping pattern indicates at least one time resource for each subband of the subbands of the BWP for estimating the CLI channel.

Some examples of the method, apparatuses, and non-transitory computer-readable medium described herein may further include operations, features, means, or instructions for identifying a TA for an uplink communication communicated by the UE during the one or more resources, the TA based on a propagation delay of a downlink communication transmitted by the second base station and transmitting, to the UE, a second message that includes the TA, where the monitoring may be based on transmitting the second message.

In some examples of the method, apparatuses, and non-transitory computer-readable medium described herein, the TA may be based on a capability of the UE.

Some examples of the method, apparatuses, and non-transitory computer-readable medium described herein may further include operations, features, means, or instructions for identifying one or more beams to restrict the UE from using to transmit the uplink communications during the one or more resources, where the message indicates the one or more beams.

In some examples of the method, apparatuses, and non-transitory computer-readable medium described herein, the one or more communication patterns indicate to the UE a set of beams that the UE may be restricted from using for the uplink communications.

Some examples of the method, apparatuses, and non-transitory computer-readable medium described herein may further include operations, features, means, or instructions for identifying a first quantity of reference signals transmitted by the second base station and identifying a second quantity of ports for estimating the CLI channel based on identifying the first quantity of reference signals, where the one or more communication patterns may be based on identifying the second quantity of ports.

In some examples of the method, apparatuses, and non-transitory computer-readable medium described herein, the second base station may be configured to transmit downlink communications over the one or more resources.

A method for wireless communication at a first base station is described. The method may include transmitting a message indicating a first resource including a first type of resource or a second resource including a second type of resource to use for estimating a CLI channel between the first base station and a second base station, where the first base station is configured to receive uplink communications or transmit downlink communications to a UE over the first type of resource and the first base station is configured to transmit the downlink communications to the UE over the second type of resource, monitoring one or more resources for CLI associated with the second base station based on transmitting the message, and processing a first uplink communication from the UE over a full-duplex resource based on monitoring the one or more resources for the CLI.

An apparatus for wireless communication at a first base station is described. The apparatus may include a processor, memory coupled with the processor, and instructions stored in the memory. The instructions may be executable by the processor to cause the apparatus to transmit a message indicating a first resource including a first type of resource or a second resource including a second type of resource to use for estimating a CLI channel between the first base station and a second base station, where the first base station is configured to receive uplink communications or transmit downlink communications to a UE over the first type of resource and the first base station is configured to transmit the downlink communications to the UE over the second type of resource, monitor one or more resources for CLI associated with the second base station based on transmitting the message, and process a first uplink communication from the UE over a full-duplex resource based on monitoring the one or more resources for the CLI.

Another apparatus for wireless communication at a first base station is described. The apparatus may include means for transmitting a message indicating a first resource including a first type of resource or a second resource including a second type of resource to use for estimating a CLI channel between the first base station and a second base station, where the first base station is configured to receive uplink communications or transmit downlink communications to a UE over the first type of resource and the first base station is configured to transmit the downlink communications to the UE over the second type of resource, means for monitoring one or more resources for CLI associated with the second base station based on transmitting the message, and means for processing a first uplink communication from the UE over a full-duplex resource based on monitoring the one or more resources for the CLI.

A non-transitory computer-readable medium storing code for wireless communication at a first base station is described. The code may include instructions executable by a processor to transmit a message indicating a first resource including a first type of resource or a second resource including a second type of resource to use for estimating a CLI channel between the first base station and a second base station, where the first base station is configured to receive uplink communications or transmit downlink communications to a UE over the first type of resource and the first base station is configured to transmit the downlink communications to the UE over the second type of resource, monitor one or more resources for CLI associated with the second base station based on transmitting the message, and process a first uplink communication from the UE over a full-duplex resource based on monitoring the one or more resources for the CLI.

Some examples of the method, apparatuses, and non-transitory computer-readable medium described herein may further include operations, features, means, or instructions for transmitting, to the UE, a second message to convert the first type of resource to the second type of resource, where monitoring the one or more resources for the CLI may be based on transmitting the message.

In some examples of the method, apparatuses, and non-transitory computer-readable medium described herein, the second message includes a slot format indicator configured to convert the first resource including the first type of resource to be the second type of resource.

In some examples of the method, apparatuses, and non-transitory computer-readable medium described herein, the first type of resource includes a flexible symbol configured to use with the uplink communications or the downlink communications and the second type of resource includes a downlink symbol.

DETAILED DESCRIPTION

Figure 1:
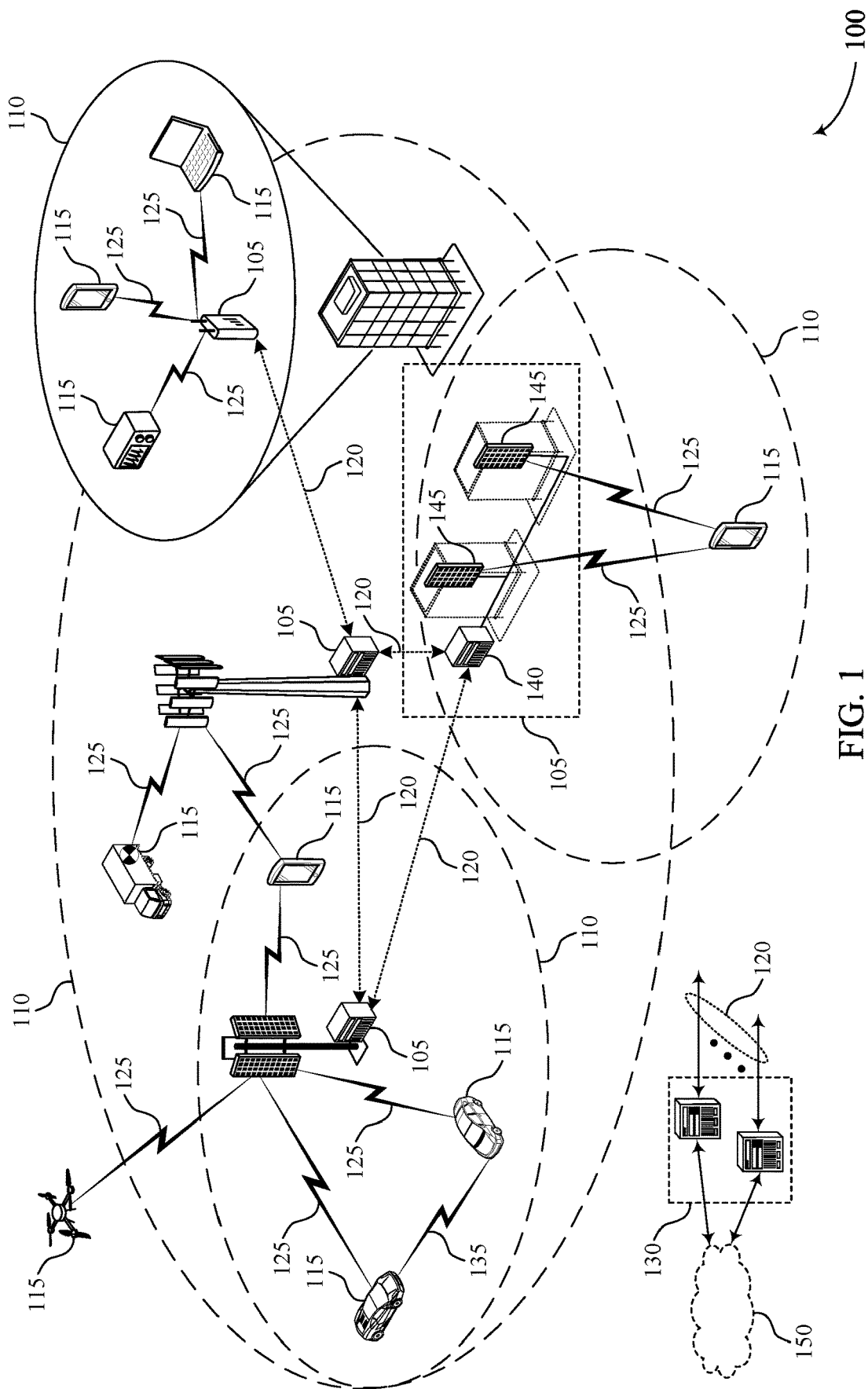
FIGS. 1 and 2 illustrate examples of a wireless communications system that supports signaling for inter-base station interference estimation in accordance with aspects of the present disclosure.

A base station may support estimating a cross-link interference (CLI) channel to perform operations to mitigate CLI. In some cases, a first base station may receive uplink communication from a first user equipment (UE) over a first set of communication resources. A second base station may transmit downlink communication to a second UE over the same set of communication resources (e.g., using the same time resources and frequency resources). Due to a direction of transmission and a signal strength of the downlink communication, the downlink communication from the second base station may interfere with the uplink transmission from the first UE in a full duplex scenario. In such cases, because of the interference, the first base station may not be able to successfully decode the uplink communication. This interference may be an example of a CLI channel between the first base station and the second base station. For the first base station to perform CLI mitigating procedures, the first base station may estimate the CLI channel (e.g., interference from the second base station on the channel). As the CLI mitigating procedure depends on the CLI estimate, obtaining an accurate CLI estimate is desirable. However, the first base station may receive uplink communications on the channel during a process to estimate the CLI channel, which may degrade the quality (accuracy) of the CLI estimate. While the description of CLI was discussed with reference to a second base station, a first UE, and a second UE, a CLI channel may occur during any signaling interference that a base station may use to receive uplink communications (e.g., from one or more UEs).

The techniques described herein provide procedures for estimating interference for full duplex communications between different nodes in a communication network. The techniques enable a first base station to estimate a CLI channel between the first base station and a second base station that uses the same resources that are used for uplink communications. For example, a UE may receive a message indicating one or more communication patterns from the first base station. In some cases, the one or more communication patterns may indicate to the UE to adjust a parameter (e.g., wait, use a reduced transmit power, mute, timing advance [TA]) for transmitting an uplink communication during a set of time resources, a set of beams, a set of ports, or any combination thereof. During the resources indicated in the one or more communication patterns, the first base station may estimate the CLI channel between the first base station and the second base station. The first base station may then use the estimated CLI channel to improve the reception of uplink communications during full duplex scenarios. In some cases, the one or more communication patterns may indicate a hopping pattern. The hopping pattern may indicate each subband of a BWP that the base station may use to measure CLI for at least one time resource. In some cases, the base station may configure the UE with a TA based on the message. In some examples, the base station may use one or more types of resources (e.g., a downlink resource or a flexible resource converted to a downlink resource) for measuring CLI.

Aspects of the disclosure are initially described in the context of wireless communications systems. Aspects are then described with respect to a process flow, resource configurations, and a wireless communications system timeline. Aspects of the disclosure are further illustrated by and described with reference to apparatus diagrams, system diagrams, and flowcharts that relate to signaling for inter-base station interference estimation.

FIG. 1 illustrates an example of a wireless communications system 100 that supports signaling for inter-base station interference estimation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, the wireless communications system 100 may support a type of full duplex communication for different base stations. Full duplex communication may include a communication device transmitting and receiving on a same time resource, a same frequency resource, or any combination thereof. If the communication device transmits and receives on the same time resource and the same frequency resource, the full duplex communication may be considered as in-band full duplex (IBFD). In IBFD, the downlink and uplink communications may share a same IBFD time and frequency resource such that the downlink and uplink communications are either partially or fully overlapped across the resources. If the communication device transmits and receives on the same time resource but on different frequency resources the full duplex communication may be considered as a sub-band flexible duplex (FDD) or sub-band full duplex (SBFD). In sub-band FDD the downlink resource may be separated from the uplink resource in the frequency domain by a guard band (GB).

In some cases, signal interference may come from inter-base station or inter-UE communication in various forms of full duplex operation. For example, a first base station may be able to configure a set of time resources for uplink or downlink communications and a second base station may be able to configure the same set of time resources for uplink or downlink communications, independently of the first base station. In situations where the first base station configures the set of resources for uplink communications and the second base station configures the set of resources for downlink communications, the first base station may experience CLI during the set of resources. In another example, a first base station 105 and a second base station 105 may be in full duplex operation and a first UE 115 and a second UE 115 may be in half duplex operation. The first base station 105 may transmit a downlink communication to the first UE 115 while receiving uplink communication from the second UE 115, causing self-interference. During a same resource, the second base station may transmit a downlink communication to either the first UE 115 or the second UE 115 and cause inter-base station interference. In one example, the first base station 105, the second base station 105, the first UE 115, and the second UE 115 may be in full duplex operation. The first UE 115 may transmit and receive wireless communication, causing self-interference. During the same resource, the second UE 115 may receive a downlink communication from the second base station 105 and cause inter-UE interference. In one example, the first base station 105 and the second base station 105 may be in half duplex operation and the first UE 115 may be in full duplex operation. The first UE 115 may transmit an uplink communication to the first base station 105 and receive a downlink communication from the second base station 105 during a same resource, causing self-interference. The various forms on interference may be examples of CLI.

In some examples, CLI management (e.g., similar to dynamic TDD scenarios) may be desirable. There may be one or more CLI mitigating procedures that may apply, or be effective, in different scenarios. For example, for intra operator interference (e.g., co-channel), during inter-base station interference, the one or more CLI mitigating procedures may include spatial separation, BWP partitioning for frequency division multiplexing (FDM), and interference cancellation (e.g., beamforming nulling and optional digital interference cancellation). During inter-UE interference, the one or more CLI mitigating procedures may include CLI aided scheduling. For inter operator interference (e.g., adjacent channel), during inter-base station interference, the one or more CLI mitigating procedures may include max uplink and downlink BWP separation and spatial separation of co-located antennas. During inter-UE interference, the one or more CLI mitigating procedures may include max uplink and downlink BWP separation.

In some examples of inter-base station CLI mitigation, a first base station 105 and a second base station 105 may coordinate. For example, in co-channel interference (e.g., dynamic TDD), a coverage area 110 (e.g., a neighboring cell or sector) may coordinate to reduce interference by restricting one or more beams, power back-off, dynamic zoning, slot conversion, or any combination thereof. In some cases, the first base station 105 and the second base station 105 may coordinate for receive beamforming (nulling) or interference cancellation that may require an inter-base station channel to project into null space.

In some cases, to perform the various CLI mitigating procedures or techniques, a victim base station 105 may estimate a CLI channel (e.g., from an aggressor base station 105). In some cases, a process that incorporates measuring for CLI may include performing receiver or transmitter nulling (e.g., beamforming nulling and digital interference cancellation) based on knowing the channel (e.g., per-tone), estimating dominant direction (beam) from the aggressor base station 105 in the channel, and finding a combiner configuration based on inter-base station CLI. In some cases, the CLI estimate may include an inter-base station channel and aggressor base station samples for the interference cancelation. As the CLI mitigating procedures depend on the CLI measurement or estimate, obtaining an accurate CLI estimate is desirable. However, the victim base station 105 may receive uplink communications on the channel during the CLI measurement or estimation, which may degrade the quality (accuracy) of the CLI measurement or estimation. To increase the accuracy of the CLI measurement or estimate at the victim base station 105, the victim base station 105 may send, to one or more connected UEs 115, a communication pattern to request the one or more connected UEs 115 to adjust a transmission parameter for uplink communications during at least a portion of time for measuring or estimating CLI. In some examples, the communication pattern may be an uplink muting indication. The uplink muting indication may prevent the one or more connected UEs 115 from transmitting uplink communications within resources used for CLI measurement or estimation, as the uplink communications may interfere with the CLI channel measurement. In some cases, simultaneous CLI channel measurement and reception of uplink communications may be possible in SBFD slots, provided enough isolation in frequency to mitigate the impact of timing misalignment.

In some examples, in an SBFD scenario, the timing misalignment for CLI channel measurement may cause an inaccurate CLI measurement. For example, the time that the victim base station 105 receives the uplink communication and the time that the victim base station 105 measures the CLI channel for interference from the aggressor base station 105 (e.g., a downlink communication from the aggressor base station 105) may be different. Because the one or more connected UEs 115 have different propagation delays than the aggressor base station 105 a cyclic prefix (CP) of the uplink communication and a second CP of the downlink communication may not overlap in time. Thus, an orthogonality between the communications may be misaligned and the quality of an estimation of CLI on the channel may be reduced. In some examples, the different propagation delays may be due to each UE 115 having a different TA while the aggressor base station 105 has no TA and each device being located at a different distance from the victim base station 105, among other examples.

In some cases, an uplink cancellation indication (ULCI) may indicate to the one or more UEs 115 to cancel a transmission in one or more resources (e.g., time and frequency). For example, the victim base station 105 may send downlink control information (DCI) 2_4 to a UE 115 to indicate to the UE 115 to cancel PUSCH (SRS) transmissions in one or more time resource, one or more frequency resource, or any combination thereof. However, this indication (e.g., L1 signaling) may introduce L1 overhead, which may cause an inefficient use of communication resources and reduce user experience.

In some examples, the described techniques may enable a base station 105 to estimate or measure CLI over resources that may also be used for uplink communications while mitigating interference from other communications. For example, a UE 115 may receive a message indicating one or more communication patterns from the base station 105. In some cases, the one or more communication patterns may indicate to the UE 115 to adjust a parameter (e.g., wait, use a reduced transmit power, mute, TA) for transmitting an uplink communication during a set of time resources, a set of beams, a set of ports, or any combination thereof. During the resources indicated in the one or more communication patterns, the base station 105 may estimate or measure the CLI. The base station 105 may then use the CLI to improve the reception of uplink communications during full duplex scenarios. In some cases, the one or more communication patterns may indicate a hopping pattern. The hopping pattern may indicate each subband of a BWP that the base station 105 may use to measure CLI for at least one time resource. In some cases, the base station 105 may configure the UE 115 with a TA based on the message. In some examples, the base station 105 may use one or more types of resources (e.g., a downlink resource or a flexible resource converted to a downlink resource) for measuring CLI.

Figure 2:
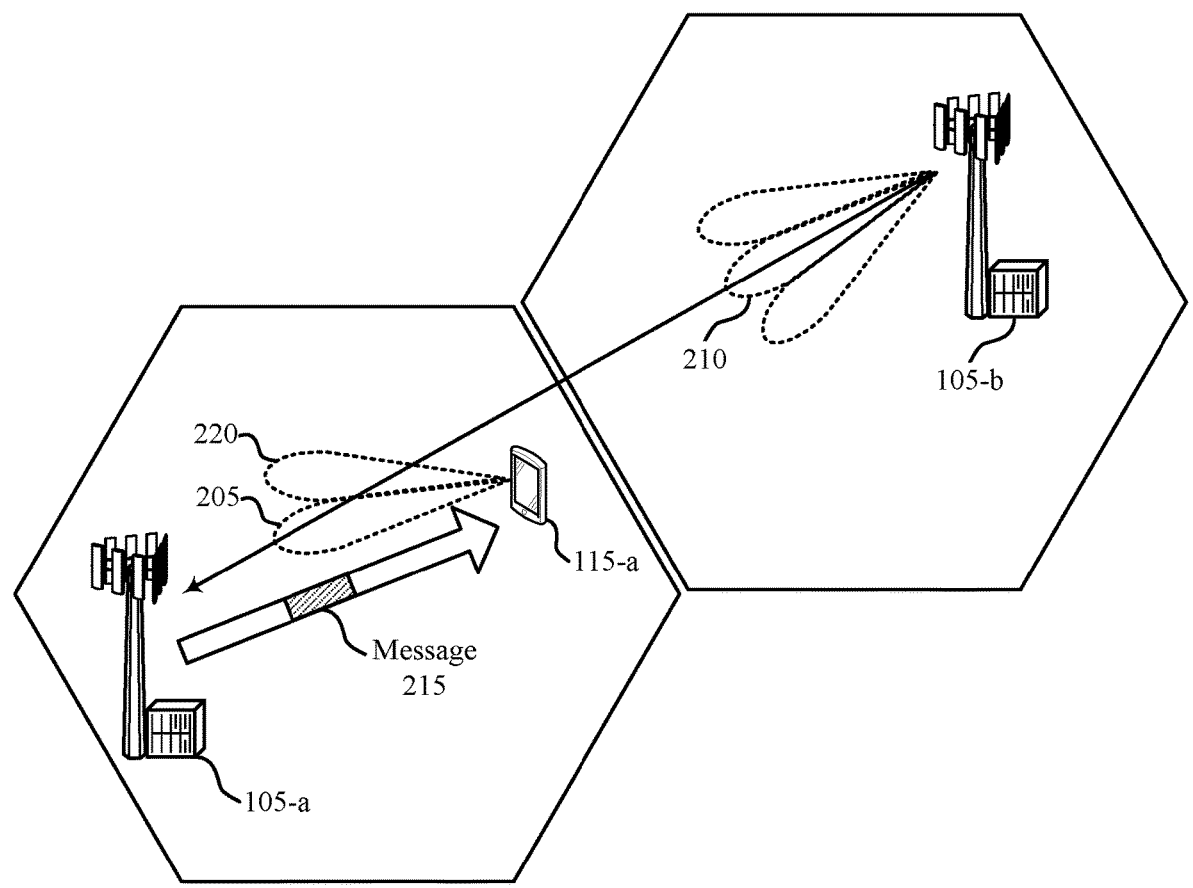

FIG. 2 illustrates an example of a wireless communications system 200 that supports signaling for inter-base station interference estimation in accordance with aspects of the present disclosure. In some examples, the wireless communications system 200 may implement aspects of the wireless communications system 100. The wireless communications system 200 may include a UE 115-a, a base station 105-a and a base station 105-b, which may be examples of a UE 115 and a base station 105 respectively, as described herein with reference to FIG. 1. In some cases, the base station 105-a may be an example of a victim base station 105 and the base station 105-b may be an example of an aggressor base station 105, as described herein with reference to FIG. 1.

In some examples, wireless communications sent by the base station 105-b may interfere with wireless communications sent by the UE 115-a to the base station 105-a. For example, the base station 105-a may receive uplink communication from the UE 115-a over an uplink beam 205. Using the same time and frequency resources, the base station 105-b may transmit over a downlink beam 210. When the base station 105-b transmits over the downlink beam 210 in a same direction as the UE 115-a transmits over the uplink beam 205, then the transmission on the downlink beam 210 may interfere with the transmission on the uplink beam 205 (e.g., CLI). In some cases, the strength of the interference may be inconsistent (e.g., signal strength, direction of transmission). Due to various variables (e.g., environmental effects, transmit power, other interference), a signal strength of the downlink beam 210 may interfere with the uplink beam 205 at differing levels. In some cases, the closer the base station 105-b transmits over the downlink beam 210 in the same direction as the uplink beam 205 the greater the CLI may be. While the description of CLI is discussed with reference to the UE 115-a and the base station 105-b, CLI may occur during any signaling interference on a channel that the base station 105-a may use to receive uplink communications (e.g., from one or more UEs 115) as described with reference to FIG. 1.

In some cases, the base station 105-a may measure or estimate the CLI channel between the base station 105-a and the base station 105-b in order to perform CLI mitigating procedures. The base station 105-a may transmit a message 215 to the UE 115-a. In some cases, the message 215 may indicate one or more communication patterns for one or more resources. The one or more communication patterns may include a set of hopping patterns, a set of muting patterns, or any combination thereof. The set of muting patterns may indicate a parameter adjustment (e.g., wait, use a reduced transmit power, mute) for uplink communications. For example, the one or more communication patterns may include a set of muting patterns that indicate time resources (symbols) where the UE 115-a may cancel uplink transmissions (e.g., transmissions over uplink beam 205). The set of muting patterns may be configured as wide-band or subband-based. In some cases, the muting pattern may include one or more resources due to an uplink timing from UE 115-a being different from a downlink timing from the base station 105-b, as described in more detail with reference to FIG. 5.

In some examples, the one or more resources may be time resources, frequency resources, or any combination thereof, where the one or more resources may be for measuring CLI on the channel (e.g., inter-base station CLI channel measurement). The one or more resources may be semi-statically (e.g., periodic or semi-persistent) configured and indicated using layer two (L2) or layer three (L3) signaling. For example, the set of muting patterns may be RRC configured. The one or more resources may be periodic, such that the CLI channel measurement may occur with a certain frequency. In one example, one or more patterns of the set of muting patterns may be activated or deactivated by L2 signaling (e.g., MAC-CE or DCI) for a semi-persistent configuration.

In some cases, the one or more communication patterns indicated by the message 215 may include an indication of a set of uplink beams to restrict. For example, the base station 105-a may determine to restrict the UE 115-a from transmitting over the uplink beam 205. Because the UE 115-a may transmit over the uplink beam 205 in the same direction as the base station 105-b may transmit over the downlink beam 210. However, the UE 115-a may transmit over a second uplink beam 220 as the UE 115-a may transmit over the second uplink beam 220 in a different direction from the downlink beam 210. In some examples, restricting the set of uplink beams may allow for simultaneous uplink receive and CLI channel measurement in a same subband (e.g., for IUD scenarios), or may allow for isolation in SBFD.

In some cases, the base station 105-a may define a set of restricted uplink beams (e.g., the uplink beam 205). For example, the one or more communication patterns may indicate the set of restricted uplink beams. The set of restricted uplink beams may indicate to the UE 115-a which uplink beams to refrain from transmitting over during CLI channel measurement occasions. In the case that the UE 115-a is scheduled to transmit uplink information over one or more restricted uplink beams of the set of restricted uplink beams, the UE 115-a may be pre-configured or configured to skip the transmission or to fallback to transmitting over some preconfigured default beam. In one example, to facilitate restricting the set of uplink beams, the base station 105-a may use a legacy spatial relation framework.

In some examples, the one or more communication patterns indicated by the message 215 may include an indication of a set of ports. For example, the CLI channel measurement may be a single-port or multi-port measurement. In some cases, the base station 105-b may transmit various downlink signals (e.g., a synchronization signal block (SSB), a multi-port CSI-RS, a physical data shared channel-demodulation reference signal (PDSCH-DMRS)) over the downlink beam 210. The quantity of ports indicated in the set of ports may be based on the various downlink signals. In some cases, the base station 105-a may configure different measurement occasions for single-port and multi-port CLI channel measurement.

In some cases, the base station 105-a may select a resource type to use for CLI channel measurement. In one example, the base station 105-a may select a first resource type semi-statically configured as a downlink resource (e.g., in TDD-UL-DL-configCommon). During the first resource type the UE 115-a may refrain from transmitting over the uplink beam 205. In some examples, the base station 105-a may transmit a configuration message (e.g., an RRC-Reconfiguration message) to change which resources to use for the CLI channel measurement.

In one example, the base station 105-a may select a second resource type (e.g., a flexible resource) to use for the CLI channel measurement. For example, the base station may select the second resource type and transmit control signaling (e.g., a DCI, an SFI) to convert the second resource type to the first resource type (e.g., a downlink resource). The base station 105-a may use the converted resource for CLI channel measurement. In some cases, the second resource type may be configured as a flexible resource in TDD-UL-DL-configCommon, TDD-UL-DL-configDedicated, or any combination thereof. Because the first resource type is used for measuring the CLI over the channel and the UE 115-a may refrain from transmitting uplink communications, the accuracy of the CLI measurement may be improved.

In some examples, the base station 105-a may transmit the control signaling (e.g., a DCI with an SFI) to change the one or more communication patterns. The UE 115-a may buffer a receive signal on the first resource type and the second resource type and resources that intersect with a search space for which the UE 115-a may perform blind decodes for physical downlink control channel (PDCCH).

Figure 3:
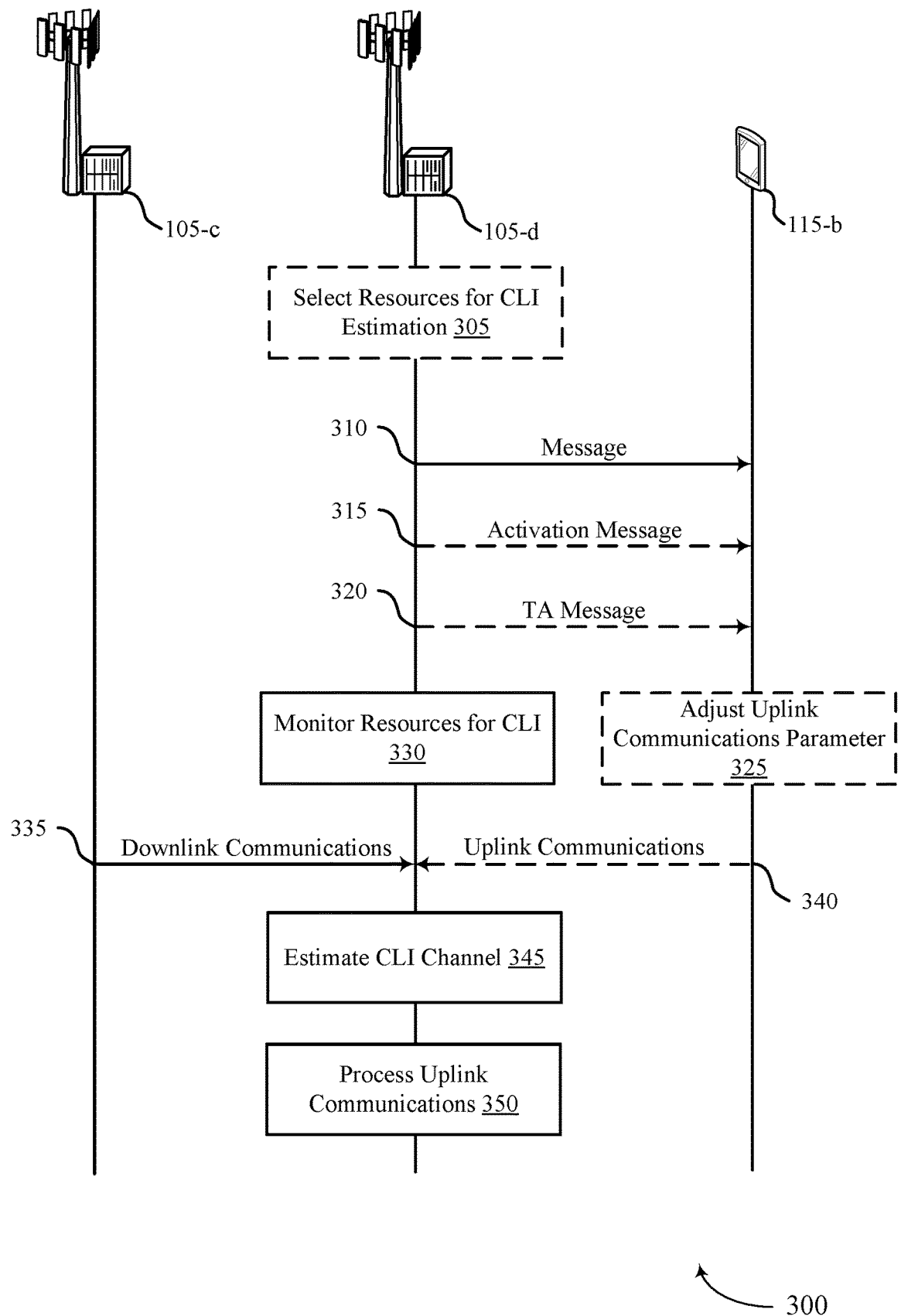
FIG. 3 illustrates an example of a process flow that supports signaling for inter-base station interference estimation in accordance with aspects of the present disclosure.

FIG. 3 illustrates an example of a process flow 300 that supports signaling for inter-base station interference estimation in accordance with aspects of the present disclosure. The process flow 300 may include a UE 115-b, a base station 105-c, and a base station 105-d, which may be respective examples of UEs 115 and base stations 105 as described with reference to FIGS. 1 and 2. In some cases, the base station 105-d may be an example of a victim base station 105 and the base station 105-c may be an example of an aggressor base station 105, as described herein with reference to FIGS. 1 and 2.

Optionally, at 305, the base station 105-d may select one or more resources for CLI estimation. In some examples, the selected resources may include one or more subbands of frequency resources and one or more slots of time resources. The selected resources may be resources associated with the base station 105-c and the UE 115-b. For example, the base station 105-c may transmit downlink communications in the direction of the base station 105-d using the selected resources. The UE 115-b may transmit uplink communications to the base station 105-d using the selected resources. Because the downlink communications and the uplink communications are using the selected resources, the downlink communications may interfere with the uplink communications at the base station 105-d (e.g., CLI). The base station 105-d may measure or estimate the CLI channel between the base station 105-c and the base station 105-d to perform CLI mitigating procedures.

At 310, the base station 105-d may transmit a message to at least the UE 115-b. In some cases, the message may include an RRC message and indicate one or more communication patterns of the selected resources for estimating the CLI channel. The one or more communication patterns may include a set of hopping patterns, a set of muting patterns, or any combination thereof. The set of muting patterns may indicate a parameter adjustment (e.g., wait, use a reduced transmit power, mute) for uplink communications.

In some examples, a hopping pattern of the set of hopping patterns may indicate a pattern of subbands across one or more slots of a BWP for estimating the CLI channel. The pattern may indicate at least one resource (e.g., a time resource) for each subband of the subbands to be used for estimating the CLI channel, such that each subband of the BWP is measured. The indicated resource for estimating the CLI channel may hop from subband to subband, across the one or more slots, until each subband of the BWP has been measured, as described in more detail with reference to FIG. 4. The hopping pattern may allow for an SBFD full duplex scenario, where a slot may contain subbands for CLI channel estimation and downlink or uplink communication. In some cases, to mitigate potential interference, a guard band may be included between the subband for CLI channel estimation and the subband for downlink or uplink communication.

Optionally, at 315, the base station 105-d may transmit an activation message. The activation message may include L2 signaling (e.g., MAC-CE or DCI) for activating or deactivating a communication pattern of the one or more communication patterns. For example, the communication pattern may be activated by the base station 105-d before estimating the CLI channel and then deactivated.

Optionally, at 320, the base station 105-d may transmit a TA message. In some cases, the TA message may comprise a TA for CLI channel estimation. For example, the downlink communications and the uplink communications may be misaligned due to different propagation delays. Because of the misalignment, the CLI channel estimation may be inaccurate. To align the communications the base station 105-d may identify a TA for the uplink communications such that an orthogonality between the communications may be aligned, as described in more detail with reference to FIG. 5. Thus, the accuracy of the CLI channel estimation may be improved. In some cases, the TA may at least be based on a capability of the UE 115-b.

Optionally, at 325, the UE 115-b may adjust an uplink communications parameter based on the indicated parameter adjustment for uplink communications using the selected resources. For example, the UE 115-b may reduce the transmit power of the uplink communications during at least a portion of the selected resources. In some cases, the UE 115-b may reduce the transmit power to an amount greater than zero, to zero, or an amount that is associated with the CLI being below a threshold (e.g., a percent of the original CLI). In one example, the UE 115-b may wait to transmit the uplink communications for an amount of time or skip the uplink communications.

At 330, the base station 105-d may monitor the selected resources for the CLI associated with the base station 105-c. In some cases, the base station 105-d may identify a BWP for estimating the CLI channel. The base station 105-d may monitor subbands of the BWP for the CLI channel estimation. In one example, the base station 105-d may monitor the subbands based on a hopping pattern of the set of hopping patterns, such that each subband of the BWP is monitored across one or more slots.

At 335, the base station 105-d may receive the downlink communications from the base station 105-c as part of monitoring the resources. The downlink communications may interfere with the uplink communications at the base station 105-d (e.g., CLI). In some cases, the strength of the interference may be inconsistent (e.g., signal strength, direction of transmission). Due to various variables (e.g., environmental effects, transmit power, other interference), a signal strength of the downlink communications may interfere with the uplink communications at differing levels. In some cases, the closer the base station 105-c transmits the downlink communications in the same direction as the uplink communications the greater the CLI.

Optionally, at 340, the UE 115-b may transmit the uplink communications to the base station 105-d over the selected resources. These uplink communications may be transmitted using an adjust parameter indicated by the message 310. In some cases, the UE 115-b may transmit the uplink communications using the selected resources, on designated subbands based on the hopping patterns, using the TA for CLI channel estimation, at a reduced transmit power, or any combination thereof. In some cases, the UE 115-b may refrain from transmitting the uplink communications over one or more beams indicated by the one or more communication patterns. The UE 115-b may determine to skip the uplink communications or use a different beam than the one or more beams.

At 345, the base station 105-d may estimate or measure the CLI channel between the base station 105-d and the base station 105-c. The CLI between the two base stations may be used in future communications to improve the reliability of decoding and account for the CLI.

At 350, the base station 105-d may process other uplink communications over resources using the estimated CLI channel. In some cases, the resource may be full duplexed with one or more of the downlink communications associated with the base station 105-c. The base station 105-d may process the uplink communications based on the estimating.

Figure 4A:
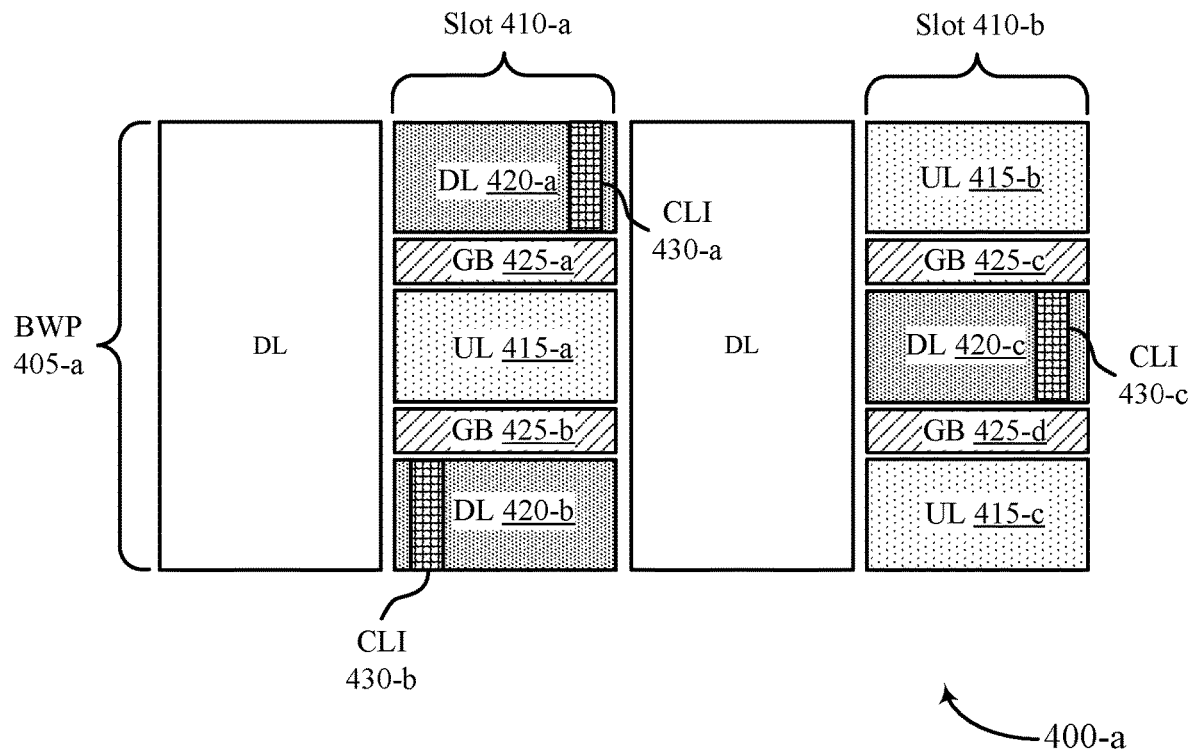
FIGS. 4A and 4B illustrate examples of configurations that support signaling for inter-base station interference estimation in accordance with aspects of the present disclosure.
Figure 4B:
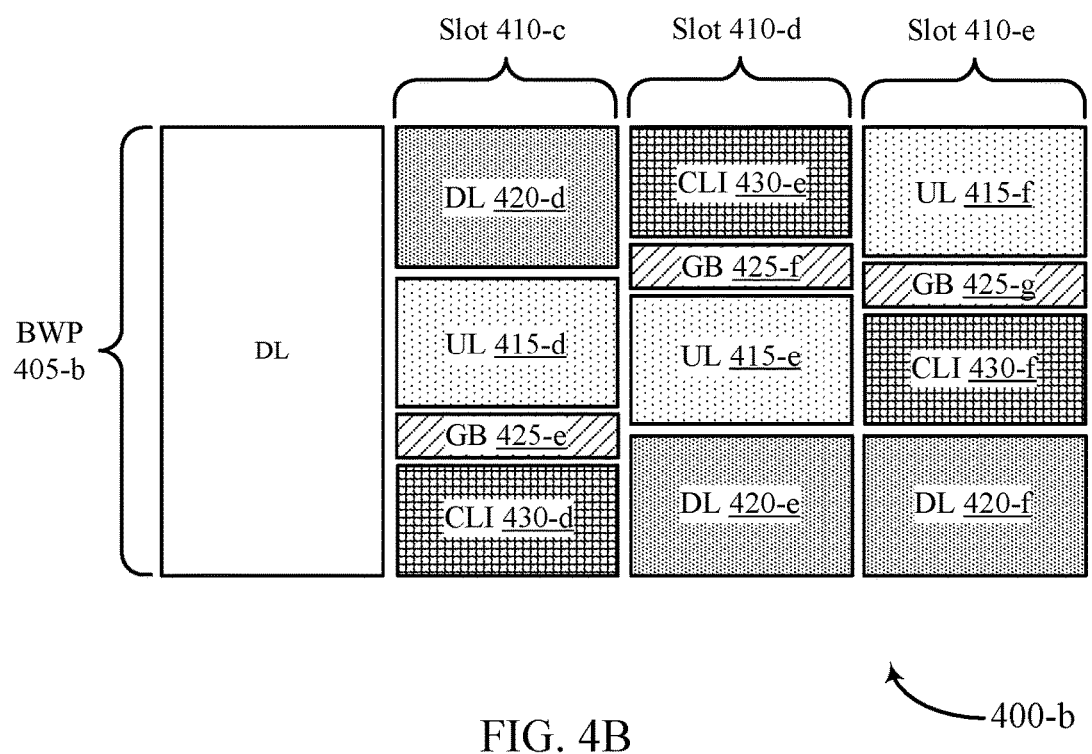

FIGS. 4A and 4B illustrate examples of a communication pattern 400-a and a communication pattern 400-b that supports signaling for inter-base station interference estimation in accordance with aspects of the present disclosure. The communication pattern 400-a and the communication pattern 400-b may be examples of the one or more communication patterns of the wireless communications system 100, the wireless communications system 200, and the process flow 300, as described with reference to FIGS. 1-3. For example, one or both of the communication pattern 400-a and the communication pattern 400-b may be implemented by one or both of a base station 105 or a UE 115 to support measuring interference for full duplex communications. While the communication pattern 400-a and the communication pattern 400-b are illustrated as examples, there may be many more similar patterns to measure CLI channel interference that are supported by the described techniques herein.

In some examples, a base station 105 may measure a channel for CLI and receive uplink communications. However, the received uplink communications may be misaligned in time with the CLI channel measurement, which may cause inter-channel interference (ICI) and reduce the quality (accuracy) of the CLI channel measurement. In some cases, a base station 105 may configure CLI channel measurements in SBFD slots of a BWP. A UE 115 may transmit the uplink communications over an SBFD slot at a first subband. The base station 105 may measure for CLI over the SBFD slot at a second subband (e.g., a same time occasion) to perform CLI mitigating procedures based on the measurement. Because the base station 105 configures the uplink communications and the CLI channel measurement on different subbands (e.g., the first subband and the second subband), frequency isolation between the different subbands may mitigate the ICI caused by time misalignment between the uplink communications and the CLI channel measurement. To further isolate the different subbands, the base station 105 may configure guard bands between uplink subbands, downlink subbands, subbands for CLI measurement, or any combination thereof. In some examples, to measure CLI over each subband of the BWP, the base station 105 may configure hopping patterns.

For example, the base station 105 may transmit a message (e.g., the message 215) that indicates one or more communication patterns for one or more slots and resources of the BWP. In order to receive uplink communications (e.g., the uplink beam 205) and simultaneously measure for CLI on a channel (e.g., the BWP) the one or more communication patterns may indicate a hopping pattern. For example, the hoping pattern may relate to a BWP 405-a or a BWP 405-b. The BWPs 405-a and 405-b may include multiple slots and resources. In some cases, the multiple slots may include half duplex slots, full duplex (e.g., SBFD) slots, or both. The SBFD full duplex slots may include various subbands for CLI measurement resources, uplink resources, downlink resources, and guard bands (sometimes referred to as GBs).

In the example of FIG. 4A, the BWP 405-a may include various half duplex and full duplex slots. In some examples, the base station 105 may measure each subband of the BWP 405-a for an accurate CLI measurement. The hopping pattern may indicate different SBFD full duplex slot configurations such that each subband includes a CLI channel measurement occasion for at least one time resource. A slot 410-a and a slot 410-b may be examples of an SBFD full duplex slot. The slots 410-a and 410-b may include resources for CLI channel measurement, downlink communication, and uplink communication. For example, the slot 410-a may include an uplink signal 415-a at a second subband. The slot 410-a may further include a downlink signal 420-a at a first subband and a downlink signal 420-b at a third subband. The downlink signals 420-a and 420-b may include CLI measurement occasions 430-a and 430-b respectively. To increase frequency isolation, and thereby increase the accuracy of the CLI channel estimation, the slot 410-a may include a GB 425-a and a GB 425-b between the uplink signal 415-a and the downlink signals 420-a and 420-b.

The slot 410-b may include the resources for CLI channel measurement, downlink communication, and uplink communication in a different configuration such that each subband of the BWP is measured for CLI. For example, the slot 410-b may include uplink signals 415-b and 415-c at the first and third subbands respectively. The slot 410-a may further include a downlink signal 420-c at the second subband, where the downlink signal 420-c may include a CLI measurement occasion 430-c. To promote frequency isolation, the slot 410-b may include a GB 425-c and a GB 425-d between the uplink signals 415-b and 415-c and the downlink signal 420-c. In some cases, the CLI measurement occasions 430-a, 430-b, and 430-c consist of one or more resources in their respective subband (e.g., two symbols).

In the example of FIG. 4B, the BWP 405-b may include various half duplex and full duplex slots. In some examples, a half-duplex slot may refer to a slot that is assigned to uplink communications or downlink communications for the base stations or cells that could interfere with one another. In some examples, a full-duplex slot may refer to a slot that is configurable for uplink or downlink by different base stations. Various combinations of slot configurations may cause CLI in a full-duplex slot. In some examples, the base station 105 may measure each subband of the BWP 405-b for an accurate CLI measurement. The hopping pattern may indicate different SBFD full duplex slot configurations such that each subband includes a CLI channel measurement occasion for at least one time resource. A slot 410-c, a slot 410-d, and a slot 410-e may be examples of an SBFD full duplex slot. The slots 410-c, 410-d, and 410-e may include resources for CLI channel measurement, downlink communication, and uplink communication. For example, the slot 410-c may include a downlink signal 420-d at a first subband, an uplink signal 415-d at a second subband, and a CLI measurement occasion 430-d at a third subband. To promote frequency isolation, and thereby increase the accuracy of the CLI channel measurement, the slot 410-c may include a GB 425-e between the uplink signal 415-d and the CLI measurement occasion 430-d. The slot 410-d may include a downlink signal 420-e at the third subband, an uplink signal 415-e at the second subband, and a CLI measurement occasion 430-e at the first subband. To promote frequency isolation, the slot 410-d may include a GB 425-f between the uplink signal 415-e and the CLI measurement occasion 430-e. The slot 410-e may include a downlink signal 420-f at the third subband, an uplink signal 415-f at the first subband, and a CLI measurement occasion 430-f at the second subband. To promote frequency isolation, the slot 410-e may include a GB 425-g between the uplink signal 415-f and the CLI measurement occasion 430-f. In some examples, the CLI measurement occasions 430-d, 430-e, and 430-f may span their entire slot (e.g., each time resource of their respective slot). In these cases, the CLI measurement occasions 430-d, 430-e, and 430-f may use different receive beams.

Figure 5:
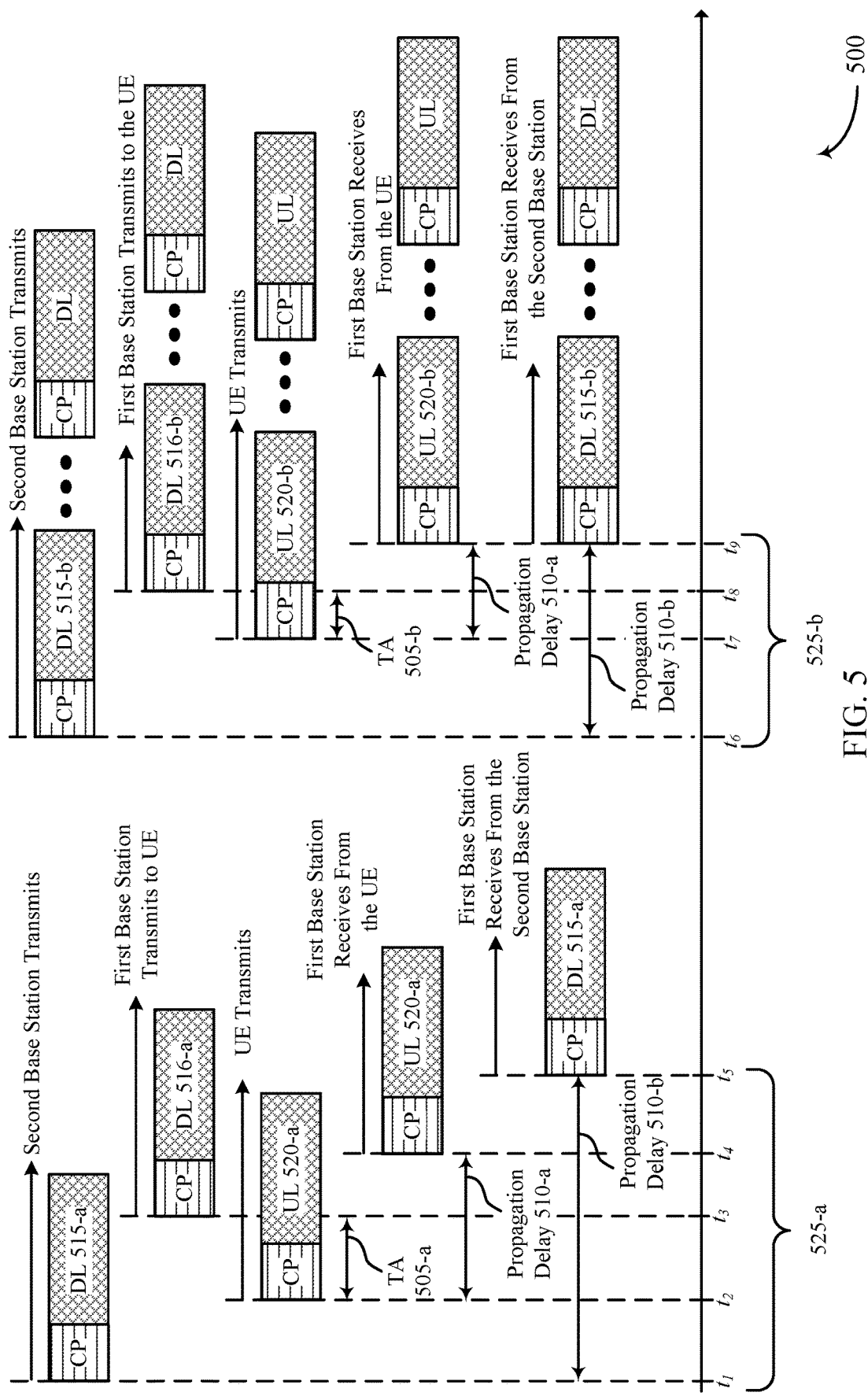
FIG. 5 illustrates an example of a wireless communications system timeline that supports signaling for inter-base station interference estimation in accordance with aspects of the present disclosure.

FIG. 5 illustrates an example of a timing diagram 500 that supports signaling for inter-base station interference estimation in accordance with aspects of the present disclosure. The timing diagram 500 includes a first base station 105, a second base station 105, and a UE 115, which may be examples of a base station 105 and a UE 115 respectively, as described herein with reference to FIG. 1. In some cases, the first base station 105 may be an example of a victim base station 105 and the second base station 105 may be an example of an aggressor base station 105, as described herein with reference to FIGS. 1 and 2. The timing diagram 500 includes a first TA configuration 525-a and a second TA configuration 525-b. In some examples, the first TA configuration 525-a may be an example of communication with CLI and the second TA configuration 525-b may be an example of a CLI measuring or estimating procedure.

In some cases, in an SBFD scenario, the timing misalignment for CLI channel measurement or estimation may cause an inaccurate CLI measurement. A time resource that the first base station 105 receives an uplink communication may be different than a time resource that the first base station 105 measures a channel for CLI from the second base station 105 (e.g., a downlink communication from the second base station 105). For example, the second base station 105 may transmit a downlink message 515-a at a time $t_1$. The UE 115 may transmit an uplink message 520-a at a time $t_2$, to the first base station 105, using a first TA 505-a. The first base station 105 may transmit a downlink message 516-a to the UE 115 at a time $t_3$, where the first TA 505-a may be an advance offset compared to the downlink message 516-a. By applying a TA to first transmission, both the first transmission and a second transmission may arrive at a receiving device at or near the same time. A first distance from the UE 115 to the first base station 105 may be less than a second distance from the second base station 105 to the first base station 105. Because the first distance is less than the second distance a propagation delay 510-a may be shorter in time than a propagation delay 510-b. The first base station 105 may receive the uplink message 520-a at a time $t_4$ and may receive the downlink message 515-a at a time $t_5$ based on the different propagation delays 510-a and 510-b. In some cases, the first distance may be less than, greater than, or equal to the second distance. Because the UE 115 has a different delay than the second base station 105, a first CP of the uplink communication and a second CP of the downlink communication may not overlap in time. Thus, an orthogonality between the communications may be misaligned and the quality of an estimation of CLI on the channel may be reduced. In some examples, the different propagation delays may be due to the UE 115 having a different TA while the second base station 105 has no TA and each device being located at a different distance from the first base station 105, among other examples.

In some examples, the time $t_4$ may be equal to the time $t_3$, the time $t_1$ may be equal to the time $t_3$ (e.g., if a downlink transmission timing is aligned at the first base station 105 and the second base station 105), or any combination thereof.

In order to reduce the offset between the uplink communication and the CLI channel measurement timing, the first base station 105 may configure one or more UEs 115 with different TA values for CLI measurement occasions. By reducing the offset, an ICI between the uplink communication and the CLI channel measurement may be reduced. For example, to align the orthogonality between the communications, the first base station 105 may transmit a message (e.g., the message 215) to the UE 115. The message may include a second TA 505-b based on the CLI measuring procedure. The UE 115 may use the second TA 505-b for determining at what time to transmit an uplink message 520-b. The first base station 105 may calculate the second TA 505-b based on a propagation delay 510-a and a propagation delay 510-b of the UE 115 and the second base station 105 respectively.

Thus, the first base station 105 may calculate the second TA 505-b such that the orthogonality between the communications may be aligned. For example, at time $t_6$, the second base station 105 may transmit a downlink message 515-b. The UE 115 may transmit an uplink message 520-b at a time $t_7$ based on the second TA 505-b. The first base station 105 may transmit a downlink message 516-b to the UE 115 at a time $t_8$, where the second TA 505-b may be an advance offset compared to the downlink message 516-b. After the propagation delay 510-a and the propagation delay 510-b, at a time $t_9$, the first base station 105 may receive the uplink message 520-b and the downlink message 515-b. In some cases, the first base station 105 may receive the uplink message 520-b and the downlink message 515-b at different times, but with overlapping time resources during their respective CP. Because the CPs overlap in time, the orthogonality between the messages may be aligned and the quality of the estimation of CLI may be improved.

In some cases, the second TA 505-b may be a zero or negative TA value to reduce the timing offset with the CLI channel measurement. If the second TA 505-b is the zero or negative TA value, consecutive uplink and downlink resource scheduling for the UE 115 may be restricted. For example, the first base station 105 may configure a guard resource between the consecutive downlink resource and the consecutive uplink resource for the UE 115.

In some cases, the UE 115 may apply the second TA 505-b. Thus, a capability of the UE 115 may determine the applicability of the second TA 505-b as a procedure for measuring CLI on the channel. For example, the UE 115 may transmit UE capability information to the first base station 105. The UE capability information may indicate that the UE 115 may apply the second TA 505-b. The first base station 105 may determine whether to transmit the second TA 505-b based on the indication.

Figure 6:
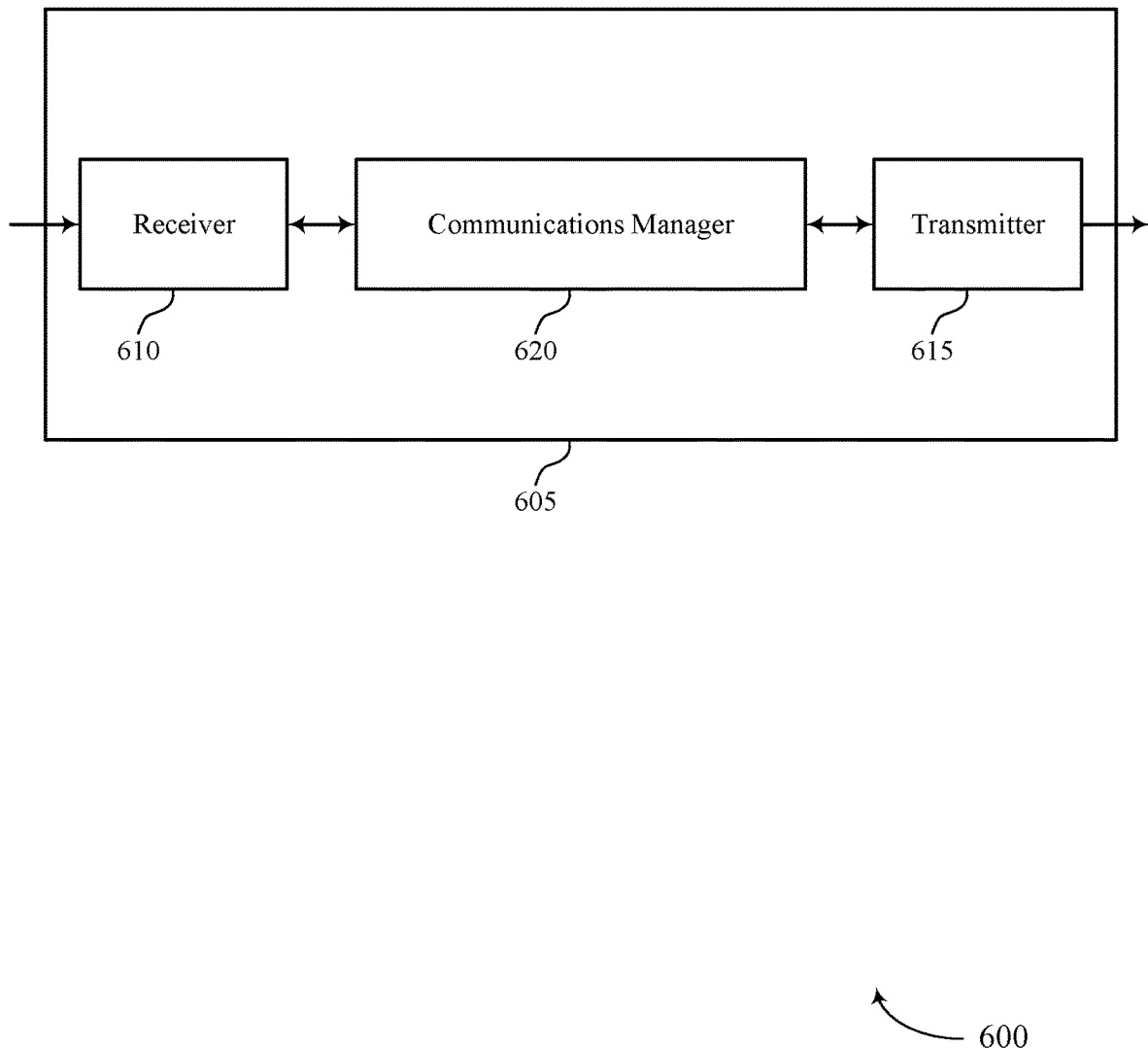
FIGS. 6 and 7 show block diagrams of devices that support signaling for inter-base station interference estimation in accordance with aspects of the present disclosure.

FIG. 6 shows a block diagram 600 of a device 605 that supports signaling for inter-base station interference estimation in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to signaling for inter-base station interference estimation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to signaling for inter-base station interference estimation). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of signaling for inter-base station interference estimation as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for receiving, from a first base station, a message that indicates one or more communication patterns of one or more resources for estimating a CLI channel between uplink communications associated with the first base station and downlink communications associated with a second base station. The communications manager 620 may be configured as or otherwise support a means for adjusting a transmission parameter for an uplink communication based on receiving the message from the first base station. The communications manager 620 may be configured as or otherwise support a means for transmitting the uplink communication over the one or more resources based on adjusting the transmission parameter.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for more efficient utilization of communication resources and more accurate CLI channel estimation.

Figure 7:
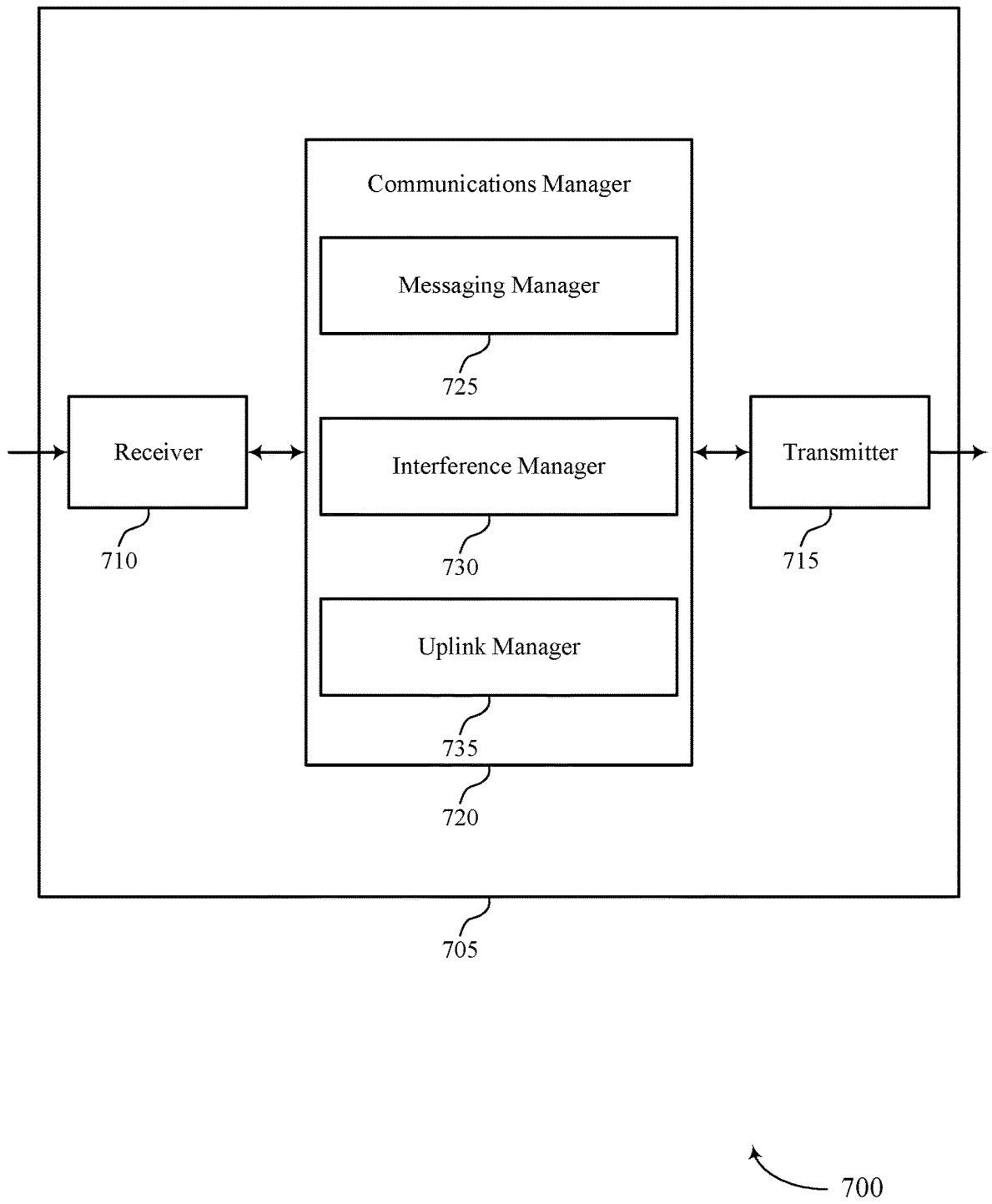

FIG. 7 shows a block diagram 700 of a device 705 that supports signaling for inter-base station interference estimation in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to signaling for inter-base station interference estimation). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to signaling for inter-base station interference estimation). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of signaling for inter-base station interference estimation as described herein. For example, the communications manager 720 may include a messaging manager 725, an interference manager 730, an uplink manager 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The messaging manager 725 may be configured as or otherwise support a means for receiving, from a first base station, a message that indicates one or more communication patterns of one or more resources for estimating a CLI channel between uplink communications associated with the first base station and downlink communications associated with a second base station. The interference manager 730 may be configured as or otherwise support a means for adjusting a transmission parameter for an uplink communication based on receiving the message from the first base station. The uplink manager 735 may be configured as or otherwise support a means for transmitting the uplink communication over the one or more resources based on adjusting the transmission parameter.

Figure 8:
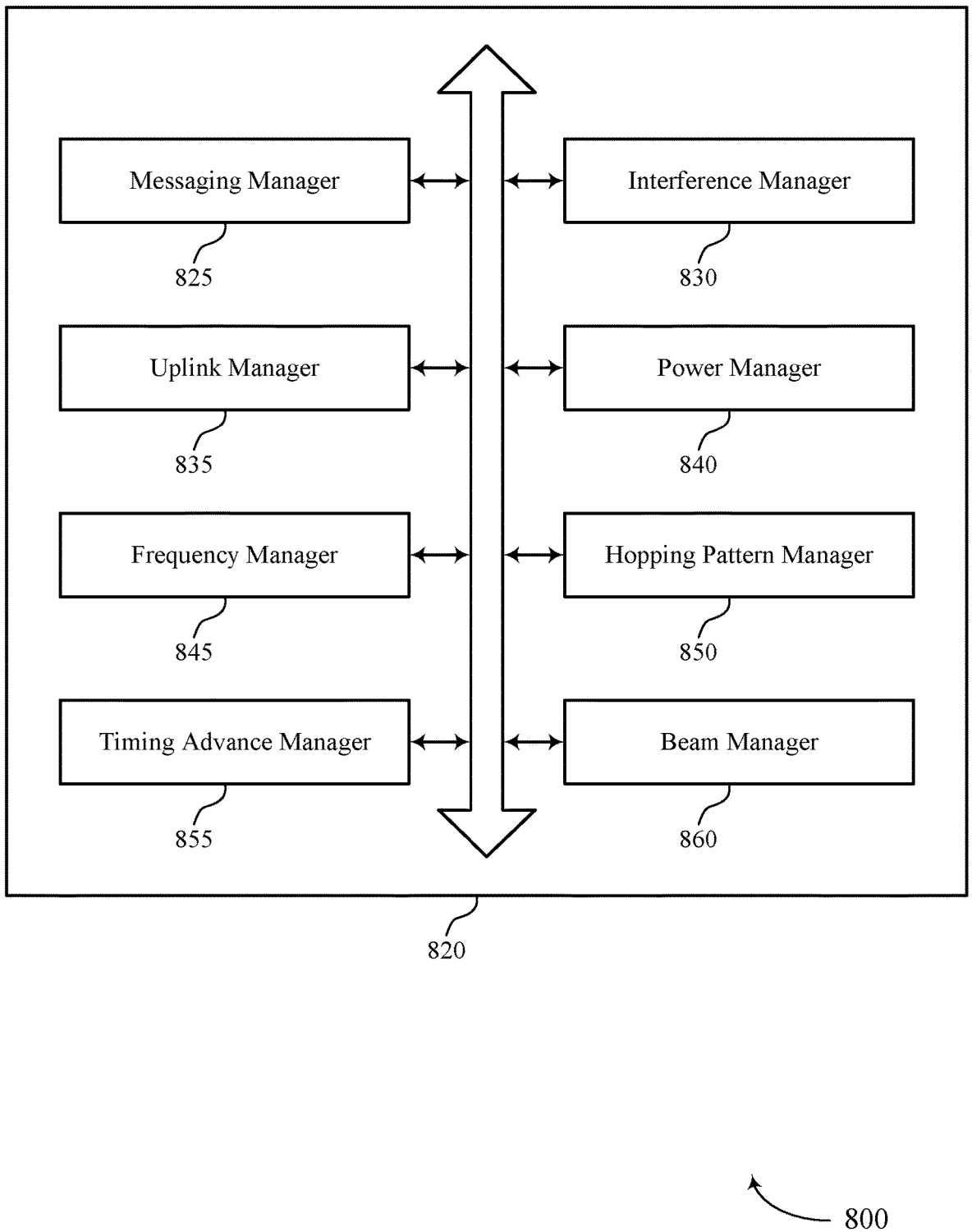
FIG. 8 shows a block diagram of a communications manager that supports signaling for inter-base station interference estimation in accordance with aspects of the present disclosure.

FIG. 8 shows a block diagram 800 of a communications manager 820 that supports signaling for inter-base station interference estimation in accordance with aspects of the present disclosure. The communications manager 820 may be an example of aspects of a communications manager 620, a communications manager 720, or both, as described herein. The communications manager 820, or various components thereof, may be an example of means for performing various aspects of signaling for inter-base station interference estimation as described herein. For example, the communications manager 820 may include a messaging manager 825, an interference manager 830, an uplink manager 835, a power manager 840, a frequency manager 845, a hopping pattern manager 850, a TA manager 855, a beam manager 860, or any combination thereof. Each of these components may communicate, directly or indirectly, with one another (e.g., via one or more buses).

The communications manager 820 may support wireless communication at a UE in accordance with examples as disclosed herein. The messaging manager 825 may be configured as or otherwise support a means for receiving, from a first base station, a message that indicates one or more communication patterns of one or more resources for estimating a CLI channel between uplink communications associated with the first base station and downlink communications associated with a second base station. The interference manager 830 may be configured as or otherwise support a means for adjusting a transmission parameter for an uplink communication based on receiving the message from the first base station. The uplink manager 835 may be configured as or otherwise support a means for transmitting the uplink communication over the one or more resources based on adjusting the transmission parameter.

In some examples, the messaging manager 825 may be configured as or otherwise support a means for receiving, from the first base station, a second message to activate a communication pattern of the one or more communication patterns, where adjusting a transmission parameter for the uplink communication is based on receiving the second message.

In some examples, the message includes a radio resource control message. In some examples, the second message includes a medium access control-control element or downlink control information.

In some examples, to support adjusting the transmission parameter for the uplink communication, the power manager 840 may be configured as or otherwise support a means for reducing the transmit power of the uplink communications during at least a portion of the one or more resources.

In some examples, to support reducing the transmit power of the uplink communications, the power manager 840 may be configured as or otherwise support a means for reducing the transmit power of the uplink communications to zero during the portion of the one or more resources.

In some examples, the frequency manager 845 may be configured as or otherwise support a means for identifying a first subband of a BWP for estimating the CLI channel, a second subband of the BWP for a second uplink communication by the UE, and a third subband of the BWP as a guard band between the first subband and the second subband based on receiving the message, the one or more resources including the BWP, where the one or more communication patterns included in the message indicate the first subband, the second subband, and the third subband, where adjusting a transmission parameter for the uplink communication is based on the identifying.

In some examples, the frequency manager 845 may be configured as or otherwise support a means for transmitting, over the second subband, the uplink communication to the first base station based on transmitting the message.

In some examples, the hopping pattern manager 850 may be configured as or otherwise support a means for identifying a hopping pattern of subbands of a BWP for estimating the CLI channel and transmitting the uplink communications based on receiving the message, the hopping pattern spanning a set of multiple slots, where the one or more communication patterns indicate the hopping pattern, where adjusting a transmission parameter for the uplink communication is based on the identifying.

In some examples, the hopping pattern indicates at least one time resource for each subband of the subbands of the BWP for estimating the CLI channel.

In some examples, to support adjusting the transmission parameter for the uplink communication, the TA manager 855 may be configured as or otherwise support a means for applying a TA for the uplink communication transmitted by the UE during a first time resource of the one or more resources based on receiving the message, the TA based on a propagation delay of a downlink communication transmitted by the second base station. In some examples, the TA is based on a capability of the UE.

In some examples, to support adjusting the transmission parameter for the uplink communication, the beam manager 860 may be configured as or otherwise support a means for identifying one or more beams to restrict the UE from using to transmit the uplink communication during the one or more resources, where the message indicates the one or more beams.

In some examples, the beam manager 860 may be configured as or otherwise support a means for receiving, from the first base station, a second message that schedules the UE with the uplink communication using the one or more beams. In some examples, the beam manager 860 may be configured as or otherwise support a means for determining to skip the uplink communication or use a different beam than the one or more beams based on the one or more communication patterns.

In some examples, the frequency manager 845 may be configured as or otherwise support a means for identifying one or more subbands of frequency resources or one or more slots of time resources or both for estimating the CLI channel, where the message includes an indication of the one or more subbands or the one or more slots.

In some examples, the one or more resources include one or more subbands of frequency resources and one or more slots of time resources.

In some examples, the one or more communication patterns indicate to the UE to mute or reduce a transmit power of one or more uplink communications during a set of time resources of the one or more resources. In some examples, the one or more communication patterns indicate a set of beams that the UE is restricted from using for the uplink communications. In some examples, the one or more communication patterns indicate one or more ports for estimating the CLI channel.

In some examples, the first base station is configured to receive the uplink communications over the one or more resources. In some examples, the second base station is configured to transmit the downlink communications over the one or more resources.

Figure 9:
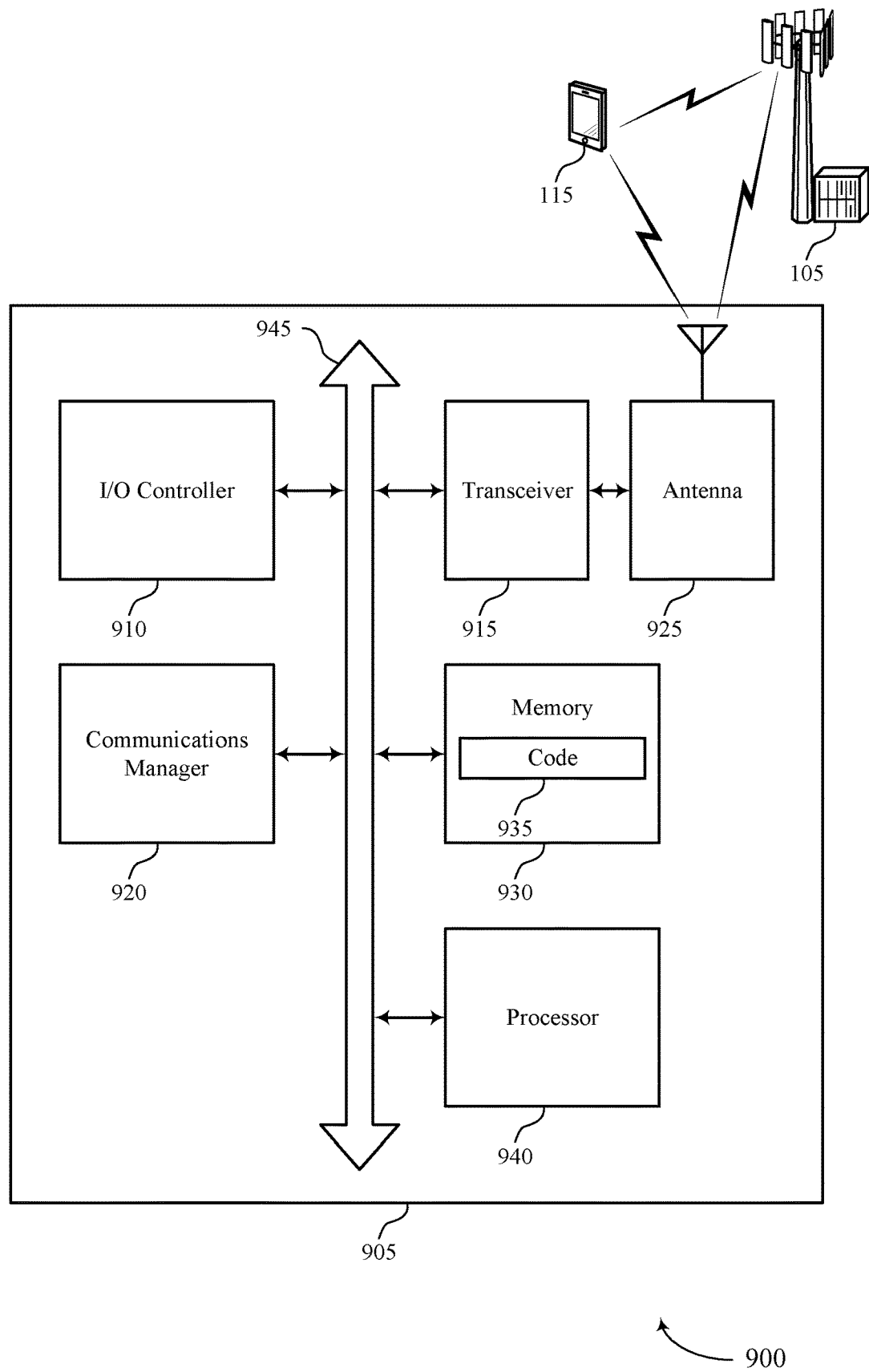
FIG. 9 shows a diagram of a system including a device that supports signaling for inter-base station interference estimation in accordance with aspects of the present disclosure.

FIG. 9 shows a diagram of a system 900 including a device 905 that supports signaling for inter-base station interference estimation in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting signaling for inter-base station interference estimation). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving, from a first base station, a message that indicates one or more communication patterns of one or more resources for estimating a CLI channel between uplink communications associated with the first base station and downlink communications associated with a second base station. The communications manager 920 may be configured as or otherwise support a means for adjusting a transmission parameter for an uplink communication based on receiving the message from the first base station. The communications manager 920 may be configured as or otherwise support a means for transmitting the uplink communication over the one or more resources based on adjusting the transmission parameter.

By including or configuring the communications manager 920 in accordance with examples as described herein, the device 905 may support techniques for more efficient utilization of communication resources and improved user experience related to reduced interference.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of signaling for inter-base station interference estimation as described herein, or the processor 940 and the memory 930 may be otherwise configured to perform or support such operations.

Figure 10:
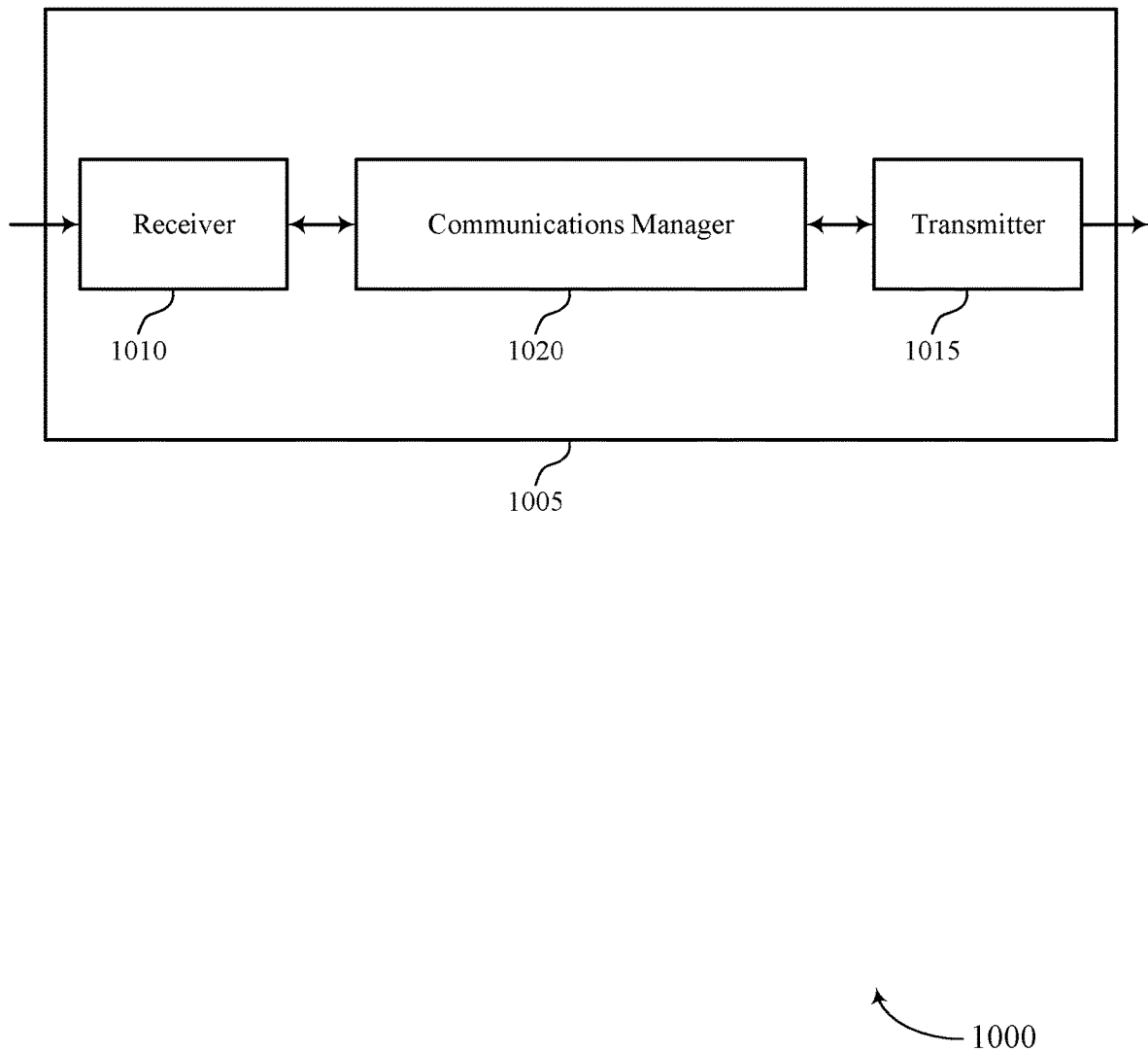
FIGS. 10 and 11 show block diagrams of devices that support signaling for inter-base station interference estimation in accordance with aspects of the present disclosure.

FIG. 10 shows a block diagram 1000 of a device 1005 that supports signaling for inter-base station interference estimation in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to signaling for inter-base station interference estimation). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to signaling for inter-base station interference estimation). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of signaling for inter-base station interference estimation as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a first base station in accordance with examples as disclosed herein. For example, the communications manager 1020 may be configured as or otherwise support a means for transmitting, to a UE, a message that indicates one or more communication patterns of one or more resources for estimating a CLI channel between the first base station and a second base station, the first base station configured to receive uplink communications over the one or more resources. The communications manager 1020 may be configured as or otherwise support a means for monitoring the one or more resources for CLI associated with the second base station based on transmitting the message. The communications manager 1020 may be configured as or otherwise support a means for processing a first uplink communication from the UE communicated over a resource full duplexed with one or more downlink communications associated with the second base station based on monitoring the one or more resources for the CLI.

Additionally, or alternatively, the communications manager 1020 may support wireless communication at a first base station in accordance with examples as disclosed herein. For example, the communications manager 1020 may be configured as or otherwise support a means for transmitting a message indicating a first resource including a first type of resource or a second resource including a second type of resource to use for estimating a CLI channel between the first base station and a second base station, where the first base station is configured to receive uplink communications or transmit downlink communications to a UE over the first type of resource and the first base station is configured to transmit the downlink communications to the UE over the second type of resource. The communications manager 1020 may be configured as or otherwise support a means for monitoring one or more resources for CLI associated with the second base station based on transmitting the message. The communications manager 1020 may be configured as or otherwise support a means for processing a first uplink communication from the UE over a full-duplex resource based on monitoring the one or more resources for the CLI.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for more efficient utilization of communication resources and more accurate CLI channel estimation.

Figure 11:
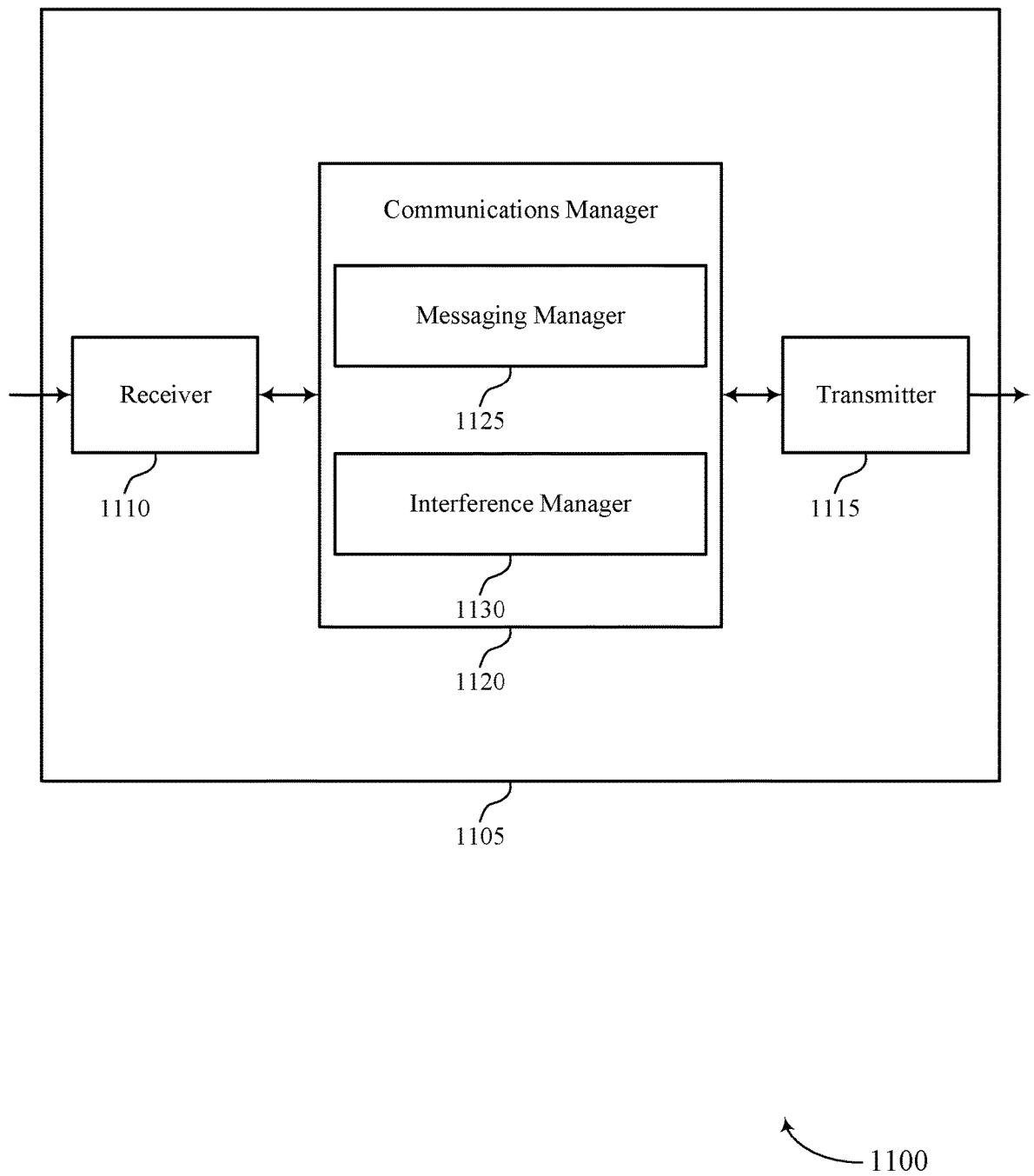

FIG. 11 shows a block diagram 1100 of a device 1105 that supports signaling for inter-base station interference estimation in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to signaling for inter-base station interference estimation). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to signaling for inter-base station interference estimation). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of signaling for inter-base station interference estimation as described herein. For example, the communications manager 1120 may include a messaging manager 1125 an interference manager 1130, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a first base station in accordance with examples as disclosed herein. The messaging manager 1125 may be configured as or otherwise support a means for transmitting, to a UE, a message that indicates one or more communication patterns of one or more resources for estimating a CLI channel between the first base station and a second base station, the first base station configured to receive uplink communications over the one or more resources. The interference manager 1130 may be configured as or otherwise support a means for monitoring the one or more resources for CLI associated with the second base station based on transmitting the message. The interference manager 1130 may be configured as or otherwise support a means for processing a first uplink communication from the UE communicated over a resource full duplexed with one or more downlink communications associated with the second base station based on monitoring the one or more resources for the CLI.

Additionally, or alternatively, the communications manager 1120 may support wireless communication at a first base station in accordance with examples as disclosed herein. The messaging manager 1125 may be configured as or otherwise support a means for transmitting a message indicating a first resource including a first type of resource or a second resource including a second type of resource to use for estimating a CLI channel between the first base station and a second base station, where the first base station is configured to receive uplink communications or transmit downlink communications to a UE over the first type of resource and the first base station is configured to transmit the downlink communications to the UE over the second type of resource. The interference manager 1130 may be configured as or otherwise support a means for monitoring one or more resources for CLI associated with the second base station based on transmitting the message. The interference manager 1130 may be configured as or otherwise support a means for processing a first uplink communication from the UE over a full-duplex resource based on monitoring the one or more resources for the CLI.

Figure 12:
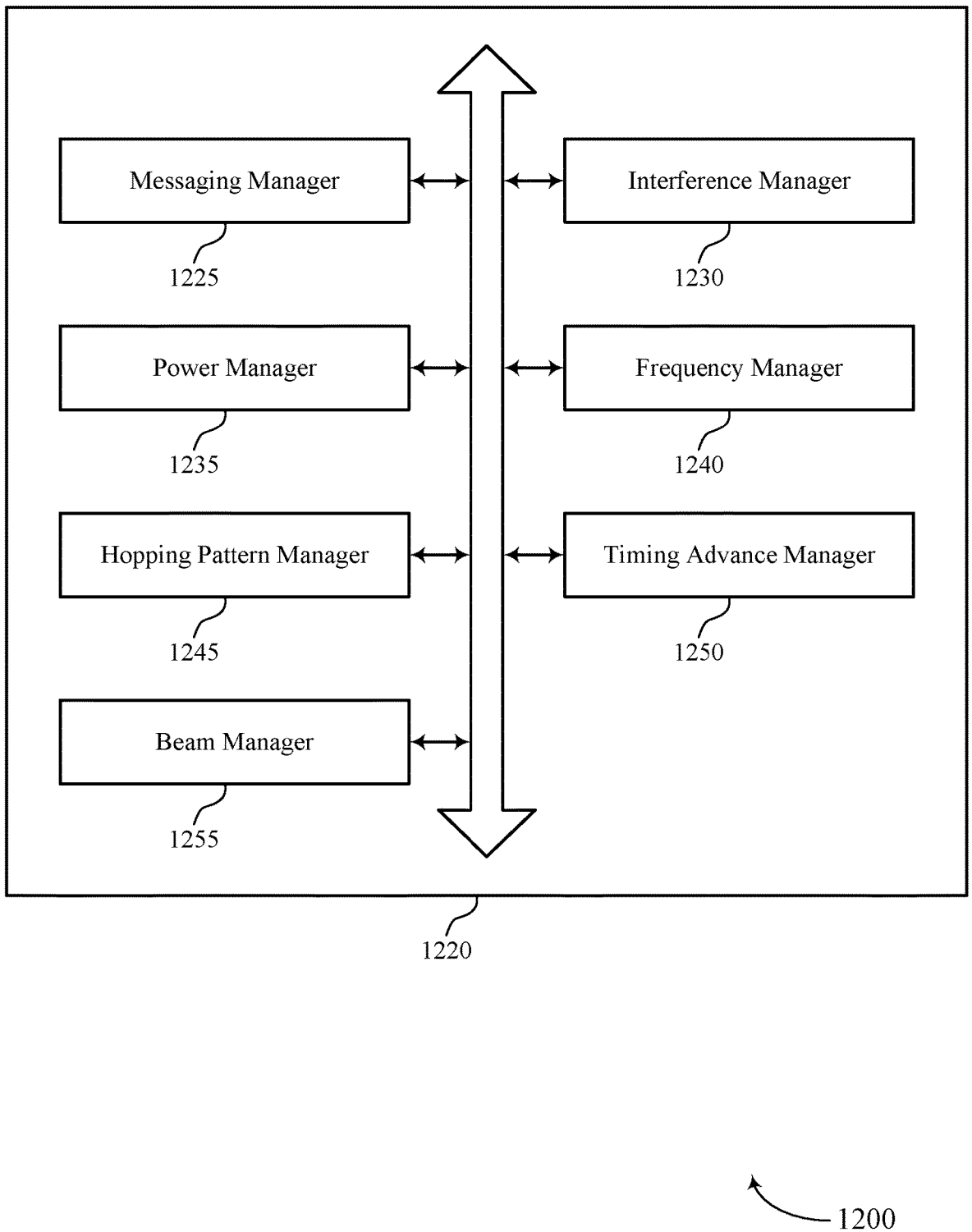
FIG. 12 shows a block diagram of a communications manager that supports signaling for inter-base station interference estimation in accordance with aspects of the present disclosure.

FIG. 12 shows a block diagram 1200 of a communications manager 1220 that supports signaling for inter-base station interference estimation in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of signaling for inter-base station interference estimation as described herein. For example, the communications manager 1220 may include a messaging manager 1225, an interference manager 1230, a power manager 1235, a frequency manager 1240, a hopping pattern manager 1245, a TA manager 1250, a beam manager 1255, or any combination thereof. Each of these components may communicate, directly or indirectly, with one another (e.g., via one or more buses).

The communications manager 1220 may support wireless communication at a first base station in accordance with examples as disclosed herein. The messaging manager 1225 may be configured as or otherwise support a means for transmitting, to a UE, a message that indicates one or more communication patterns of one or more resources for estimating a CLI channel between the first base station and a second base station, the first base station configured to receive uplink communications over the one or more resources. The interference manager 1230 may be configured as or otherwise support a means for monitoring the one or more resources for CLI associated with the second base station based on transmitting the message. In some examples, the interference manager 1230 may be configured as or otherwise support a means for processing a first uplink communication from the UE communicated over a resource full duplexed with one or more downlink communications associated with the second base station based on monitoring the one or more resources for the CLI.

In some examples, the messaging manager 1225 may be configured as or otherwise support a means for transmitting a second message to activate a communication pattern of the one or more communication patterns, where monitoring the one or more resources for the CLI is based on transmitting the second message.

In some examples, the message includes a radio resource control message. In some examples, the second message includes a medium access control-control element or downlink control information.

In some examples, the power manager 1235 may be configured as or otherwise support a means for identifying one or more UEs to mute the uplink communications during at least a portion of the one or more resources, the one or more UEs including the first UE, where transmitting the message is based on identifying the one or more UEs.

In some examples, the power manager 1235 may be configured as or otherwise support a means for identifying one or more UEs to reduce a transmit power of the uplink communications during at least a portion of the one or more resources, the one or more UEs including the first UE, where transmitting the message is based on identifying the one or more UEs.

In some examples, the frequency manager 1240 may be configured as or otherwise support a means for identifying one or more subbands of frequency resources or one or more slots of time resources or both for estimating the CLI channel, where the message includes an indication of the one or more subbands or the one or more slots.

In some examples, the one or more resources include one or more subbands of frequency resources and one or more slots of time resources. In some examples, the one or more communication patterns indicate to the UE to mute or reduce a transmit power of one or more uplink communications during a set of time resources of the one or more resources.

In some examples, the frequency manager 1240 may be configured as or otherwise support a means for identifying a first subband of a BWP for estimating the CLI channel, a second subband of the BWP for an uplink communication by the UE, and a third subband of the BWP as a guard band between the first subband and the second subband, the one or more resources including the BWP, where the one or more communication patterns included in the message indicate the first subband, the second subband, and the third subband. In some examples, monitoring the one or more resources further includes monitoring the first subband of the BWP for the CLI.

In some examples, the frequency manager 1240 may be configured as or otherwise support a means for receiving, over the second subband, the uplink communication from the UE based on transmitting the message.

In some examples, the hopping pattern manager 1245 may be configured as or otherwise support a means for identifying a hopping pattern of subbands of a BWP for estimating the CLI channel and receiving the uplink communications, the hopping pattern spanning a set of multiple slots, where the one or more communication patterns indicate the hopping pattern.

In some examples, the hopping pattern indicates at least one time resource for each subband of the subbands of the BWP for estimating the CLI channel.

In some examples, the TA manager 1250 may be configured as or otherwise support a means for identifying a TA for an uplink communication communicated by the UE during the one or more resources, the TA based on a propagation delay of a downlink communication transmitted by the second base station. In some examples, the TA manager 1250 may be configured as or otherwise support a means for transmitting, to the UE, a second message that includes the TA, where the monitoring is based on transmitting the second message. In some examples, the TA is based on a capability of the UE.

In some examples, the beam manager 1255 may be configured as or otherwise support a means for identifying one or more beams to restrict the UE from using to transmit the uplink communications during the one or more resources, where the message indicates the one or more beams.

In some examples, the one or more communication patterns indicate to the UE a set of beams that the UE is restricted from using for the uplink communications.

In some examples, the interference manager 1230 may be configured as or otherwise support a means for identifying a first quantity of reference signals transmitted by the second base station. In some examples, the interference manager 1230 may be configured as or otherwise support a means for identifying a second quantity of ports for estimating the CLI channel based on identifying the first quantity of reference signals, where the one or more communication patterns are based on identifying the second quantity of ports. In some examples, the second base station is configured to transmit downlink communications over the one or more resources.

Additionally, or alternatively, the communications manager 1220 may support wireless communication at a first base station in accordance with examples as disclosed herein. In some examples, the messaging manager 1225 may be configured as or otherwise support a means for transmitting a message indicating a first resource including a first type of resource or a second resource including a second type of resource to use for estimating a CLI channel between the first base station and a second base station, where the first base station is configured to receive uplink communications or transmit downlink communications to a UE over the first type of resource and the first base station is configured to transmit the downlink communications to the UE over the second type of resource. In some examples, the interference manager 1230 may be configured as or otherwise support a means for monitoring one or more resources for CLI associated with the second base station based on transmitting the message. In some examples, the interference manager 1230 may be configured as or otherwise support a means for processing a first uplink communication from the UE over a full-duplex resource based on monitoring the one or more resources for the CLI.

In some examples, the messaging manager 1225 may be configured as or otherwise support a means for transmitting, to the UE, a second message to convert the first type of resource to the second type of resource, where monitoring the one or more resources for the CLI is based on transmitting the message.

In some examples, the second message includes a slot format indicator configured to convert the first resource including the first type of resource to be the second type of resource.

In some examples, the first type of resource includes a flexible symbol configured to use with the uplink communications or the downlink communications. In some examples, the second type of resource includes a downlink symbol.

Figure 13:
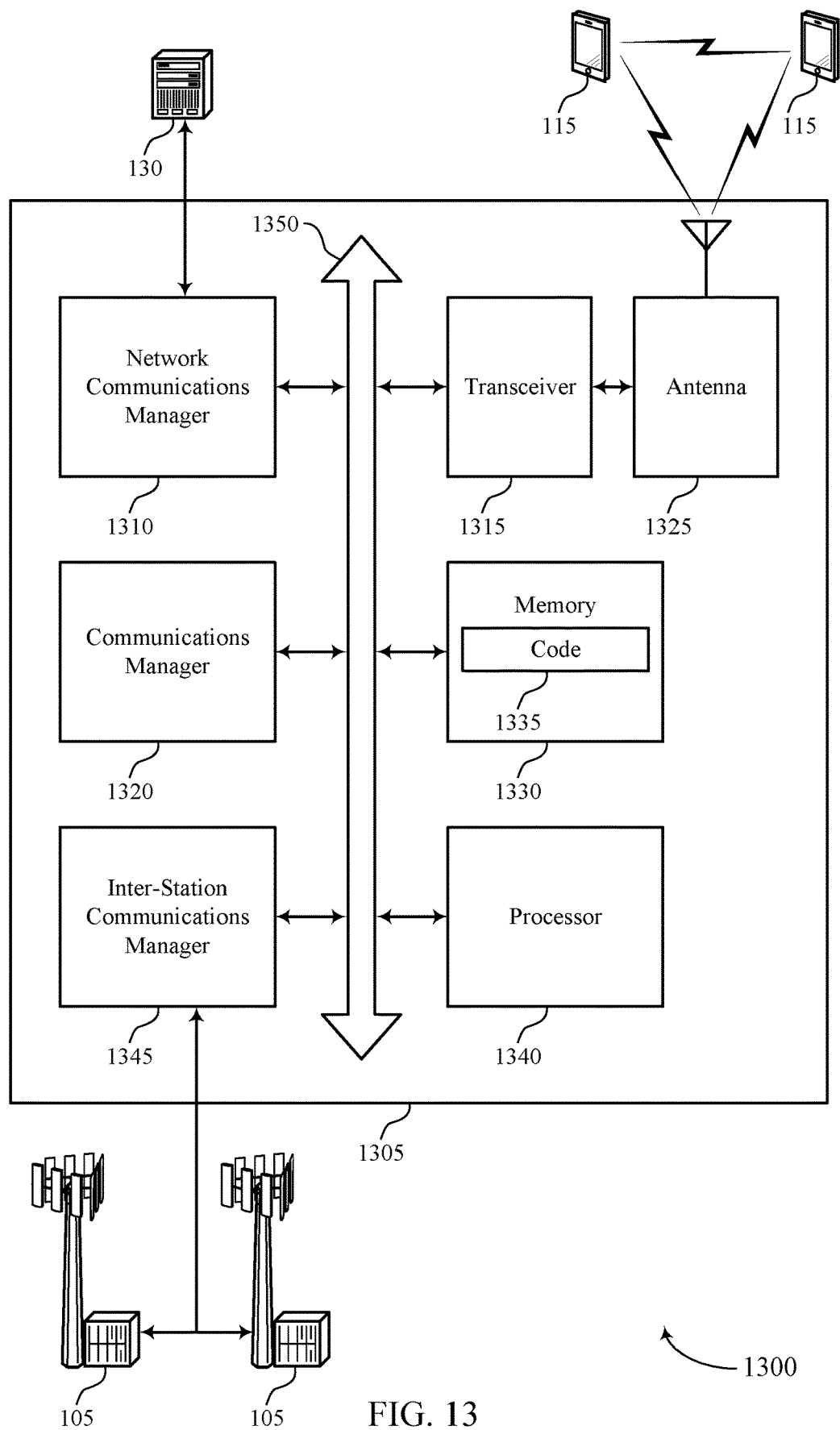
FIG. 13 shows a diagram of a system including a device that supports signaling for inter-base station interference estimation in accordance with aspects of the present disclosure.

FIG. 13 shows a diagram of a system 1300 including a device 1305 that supports signaling for inter-base station interference estimation in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory.

In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting signaling for inter-base station interference estimation). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a first base station in accordance with examples as disclosed herein. For example, the communications manager 1320 may be configured as or otherwise support a means for transmitting, to a UE, a message that indicates one or more communication patterns of one or more resources for estimating a CLI channel between the first base station and a second base station, the first base station configured to receive uplink communications over the one or more resources. The communications manager 1320 may be configured as or otherwise support a means for monitoring the one or more resources for CLI associated with the second base station based on transmitting the message. The communications manager 1320 may be configured as or otherwise support a means for processing a first uplink communication from the UE communicated over a resource full duplexed with one or more downlink communications associated with the second base station based on monitoring the one or more resources for the CLI.

Additionally, or alternatively, the communications manager 1320 may support wireless communication at a first base station in accordance with examples as disclosed herein. For example, the communications manager 1320 may be configured as or otherwise support a means for transmitting a message indicating a first resource including a first type of resource or a second resource including a second type of resource to use for estimating a CLI channel between the first base station and a second base station, where the first base station is configured to receive uplink communications or transmit downlink communications to a UE over the first type of resource and the first base station is configured to transmit the downlink communications to the UE over the second type of resource. The communications manager 1320 may be configured as or otherwise support a means for monitoring one or more resources for CLI associated with the second base station based on transmitting the message. The communications manager 1320 may be configured as or otherwise support a means for processing a first uplink communication from the UE over a full-duplex resource based on monitoring the one or more resources for the CLI.

By including or configuring the communications manager 1320 in accordance with examples as described herein, the device 1305 may support techniques for more efficient utilization of communication resources and improved user experience related to reduced interference.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of signaling for inter-base station interference estimation as described herein, or the processor 1340 and the memory 1330 may be otherwise configured to perform or support such operations.

Figure 14:
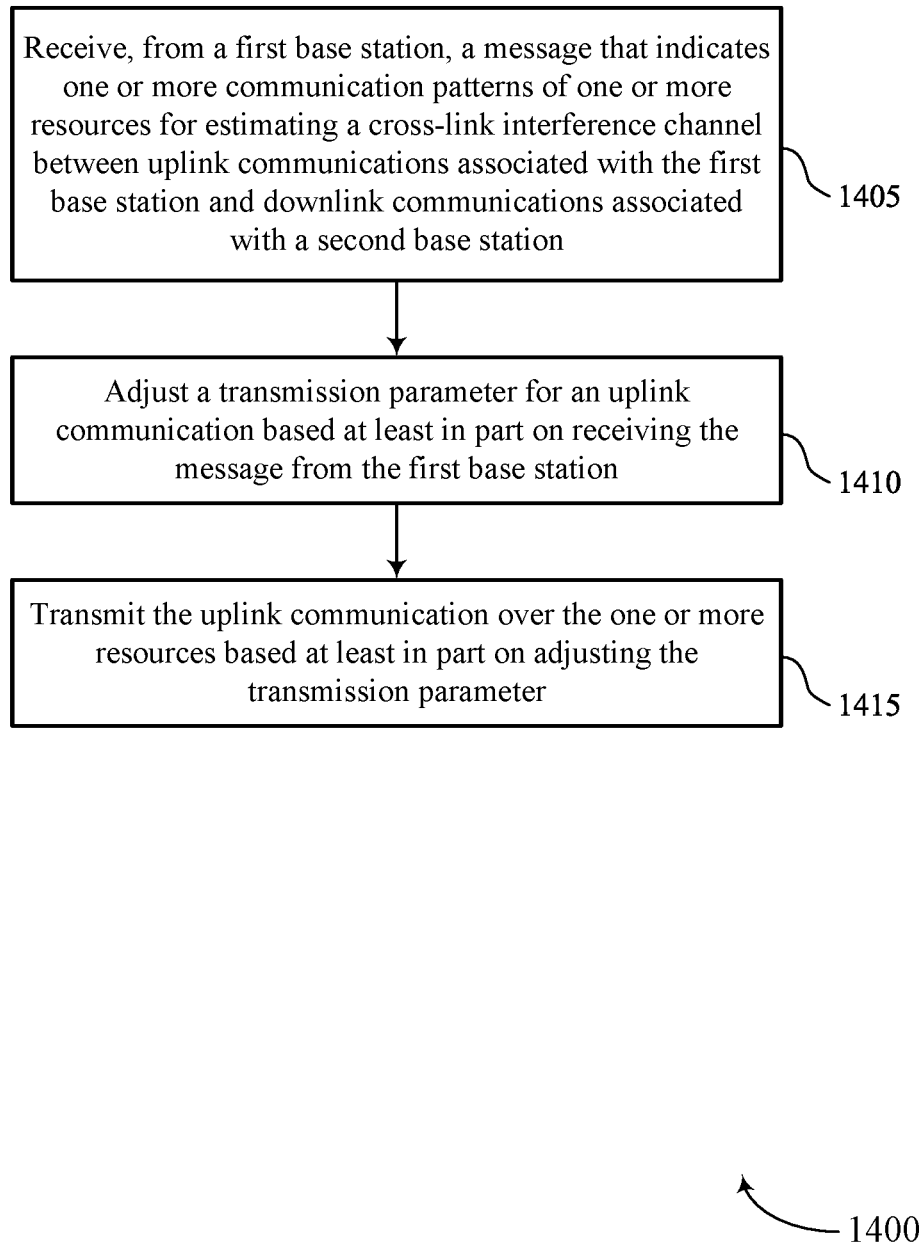
FIGS. 14 through 18 show flowcharts illustrating methods that support signaling for inter-base station interference estimation in accordance with aspects of the present disclosure.

FIG. 14 shows a flowchart illustrating a method 1400 that supports signaling for inter-base station interference estimation in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving, from a first base station, a message that indicates one or more communication patterns of one or more resources for estimating a CLI channel between uplink communications associated with the first base station and downlink communications associated with a second base station. The operations of 1405 may be performed in accordance with examples as disclosed herein. In some examples, aspects of the operations of 1405 may be performed by a messaging manager 825 as described with reference to FIG. 8.

At 1410, the method may include adjusting a transmission parameter for an uplink communication based on receiving the message from the first base station. The operations of 1410 may be performed in accordance with examples as disclosed herein. In some examples, aspects of the operations of 1410 may be performed by an interference manager 830 as described with reference to FIG. 8.

At 1415, the method may include transmitting the uplink communication over the one or more resources based on adjusting the transmission parameter. The operations of 1415 may be performed in accordance with examples as disclosed herein. In some examples, aspects of the operations of 1415 may be performed by an uplink manager 835 as described with reference to FIG. 8.

Figure 15:
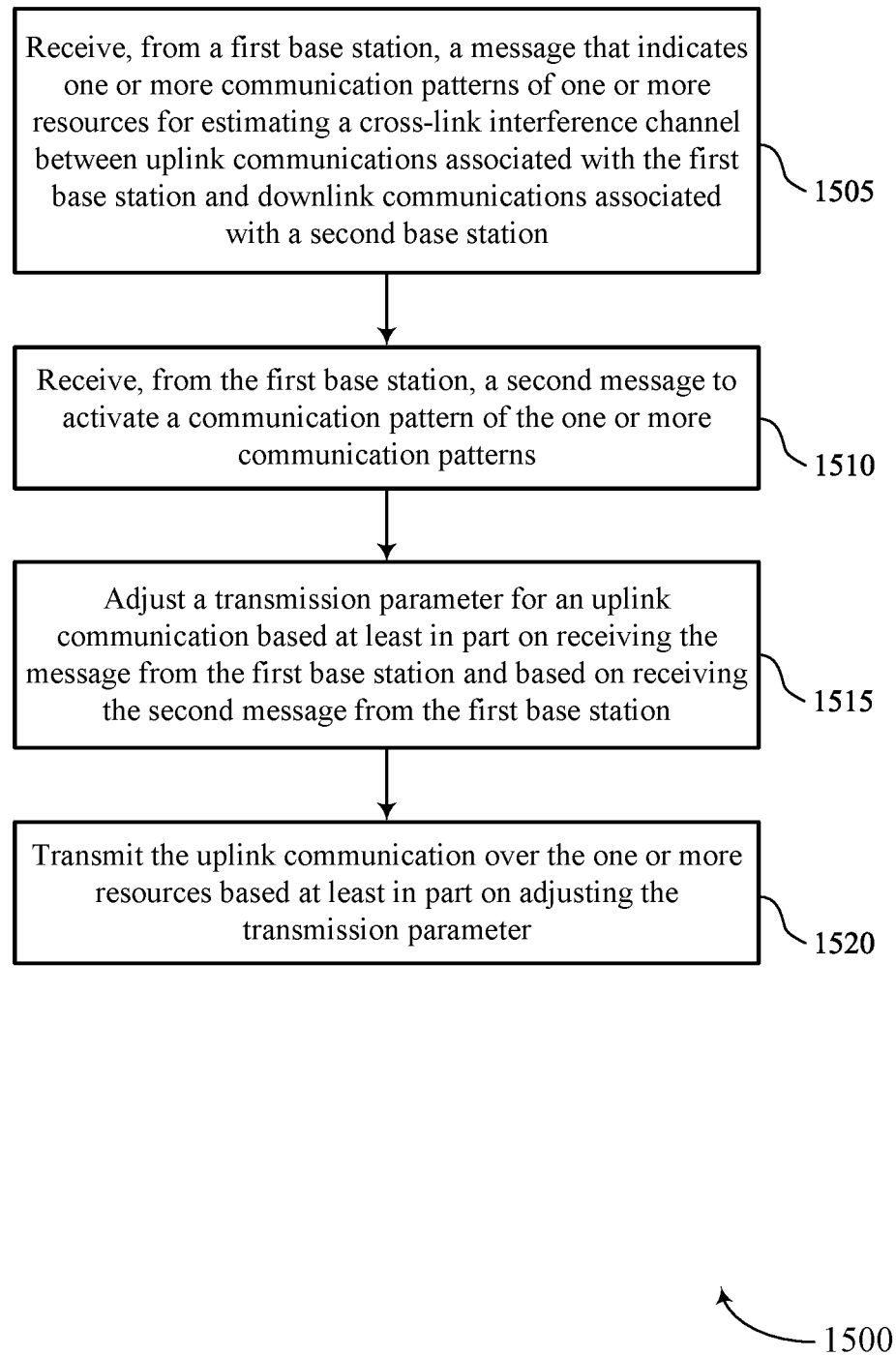

FIG. 15 shows a flowchart illustrating a method 1500 that supports signaling for inter-base station interference estimation in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving, from a first base station, a message that indicates one or more communication patterns of one or more resources for estimating a CLI channel between uplink communications associated with the first base station and downlink communications associated with a second base station. The operations of 1505 may be performed in accordance with examples as disclosed herein. In some examples, aspects of the operations of 1505 may be performed by a messaging manager 825 as described with reference to FIG. 8.

At 1510, the method may include receiving, from the first base station, a second message to activate a communication pattern of the one or more communication patterns. The operations of 1510 may be performed in accordance with examples as disclosed herein. In some examples, aspects of the operations of 1510 may be performed by a messaging manager 825 as described with reference to FIG. 8.

At 1515, the method may include adjusting a transmission parameter for an uplink communication based on receiving the message from the first base station and based on receiving the second message from the first base station. The operations of 1515 may be performed in accordance with examples as disclosed herein. In some examples, aspects of the operations of 1515 may be performed by an interference manager 830 as described with reference to FIG. 8.

At 1520, the method may include transmitting the uplink communication over the one or more resources based on adjusting the transmission parameter. The operations of 1520 may be performed in accordance with examples as disclosed herein. In some examples, aspects of the operations of 1520 may be performed by an uplink manager 835 as described with reference to FIG. 8.

Figure 16:
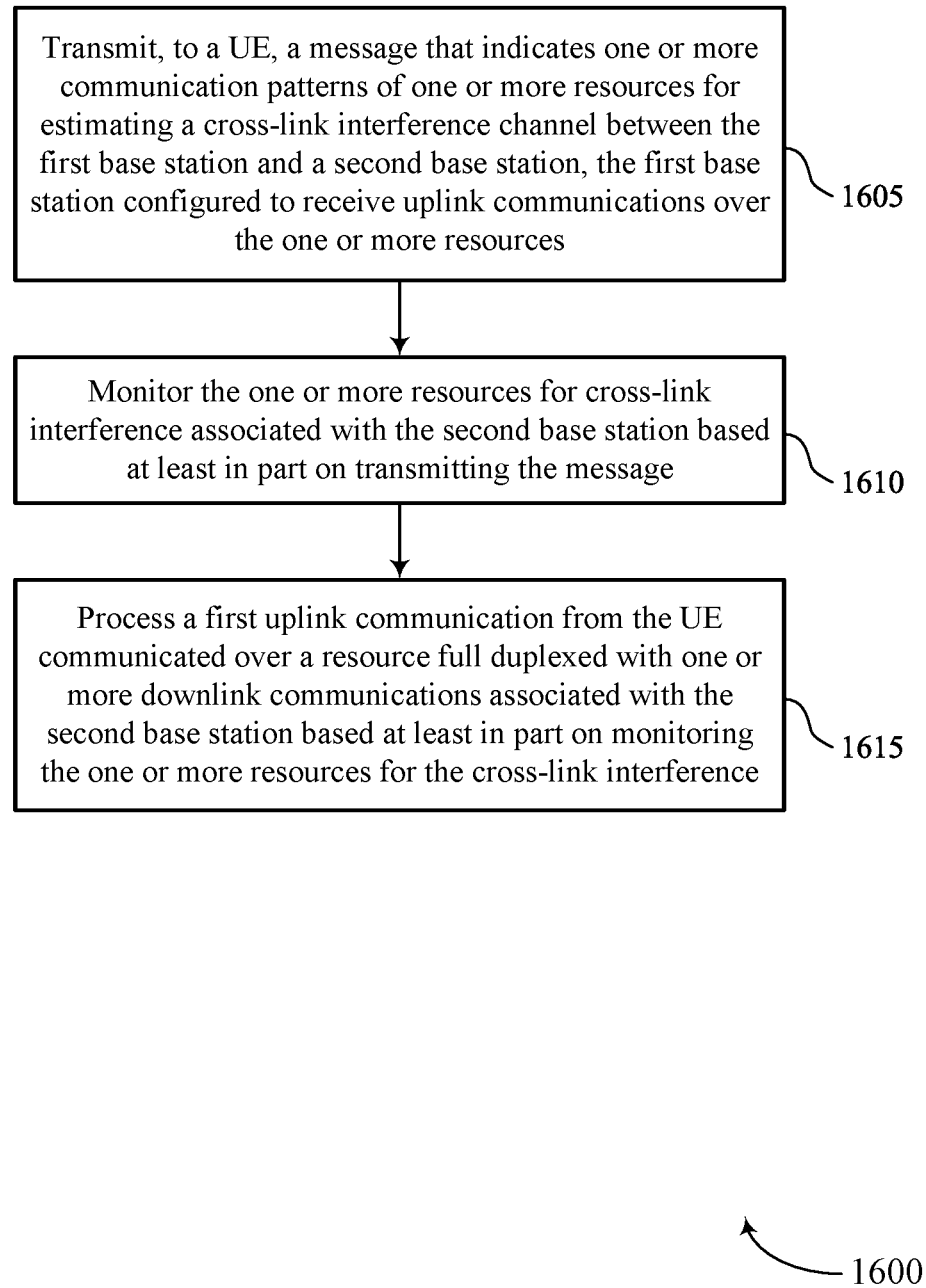

FIG. 16 shows a flowchart illustrating a method 1600 that supports signaling for inter-base station interference estimation in accordance with aspects of the present disclosure. The operations of the method 1600 may be implemented by a base station or its components as described herein. For example, the operations of the method 1600 may be performed by a base station 105 as described with reference to FIGS. 1 through 5 and 10 through 13. In some examples, a base station may execute a set of instructions to control the functional elements of the base station to perform the described functions. Additionally, or alternatively, the base station may perform aspects of the described functions using special-purpose hardware.

At 1605, the method may include transmitting, to a UE, a message that indicates one or more communication patterns of one or more resources for estimating a CLI channel between the first base station and a second base station, the first base station configured to receive uplink communications over the one or more resources. The operations of 1605 may be performed in accordance with examples as disclosed herein. In some examples, aspects of the operations of 1605 may be performed by a messaging manager 1225 as described with reference to FIG. 12.

At 1610, the method may include monitoring the one or more resources for CLI associated with the second base station based on transmitting the message. The operations of 1610 may be performed in accordance with examples as disclosed herein. In some examples, aspects of the operations of 1610 may be performed by an interference manager 1230 as described with reference to FIG. 12.

At 1615, the method may include processing a first uplink communication from the UE communicated over a resource full duplexed with one or more downlink communications associated with the second base station based on monitoring the one or more resources for the CLI. The operations of 1615 may be performed in accordance with examples as disclosed herein. In some examples, aspects of the operations of 1615 may be performed by an interference manager 1230 as described with reference to FIG. 12.

Figure 17:
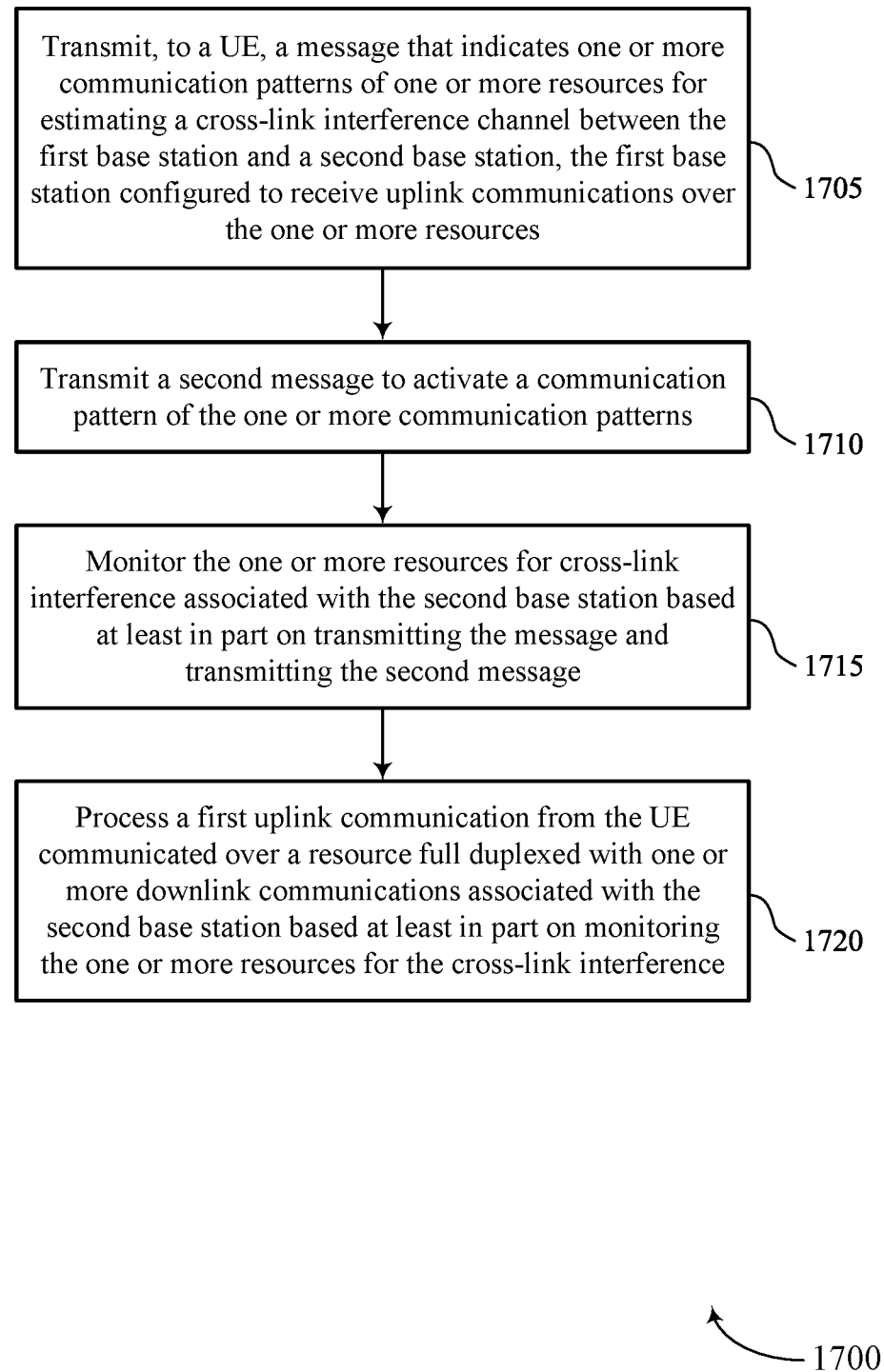

FIG. 17 shows a flowchart illustrating a method 1700 that supports signaling for inter-base station interference estimation in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally, or alternatively, the base station may perform aspects of the described functions using special-purpose hardware.

At 1705, the method may include transmitting, to a UE, a message that indicates one or more communication patterns of one or more resources for estimating a CLI channel between the first base station and a second base station, the first base station configured to receive uplink communications over the one or more resources. The operations of 1705 may be performed in accordance with examples as disclosed herein. In some examples, aspects of the operations of 1705 may be performed by a messaging manager 1225 as described with reference to FIG. 12.

At 1710, the method may include transmitting a second message to activate a communication pattern of the one or more communication patterns. The operations of 1710 may be performed in accordance with examples as disclosed herein. In some examples, aspects of the operations of 1710 may be performed by a messaging manager 1225 as described with reference to FIG. 12.

At 1715, the method may include monitoring the one or more resources for CLI associated with the second base station based on transmitting the message and transmitting the second message. The operations of 1715 may be performed in accordance with examples as disclosed herein. In some examples, aspects of the operations of 1715 may be performed by an interference manager 1230 as described with reference to FIG. 12.

At 1720, the method may include processing a first uplink communication from the UE communicated over a resource full duplexed with one or more downlink communications associated with the second base station based on monitoring the one or more resources for the CLI. The operations of 1720 may be performed in accordance with examples as disclosed herein. In some examples, aspects of the operations of 1720 may be performed by an interference manager 1230 as described with reference to FIG. 12.

Figure 18:
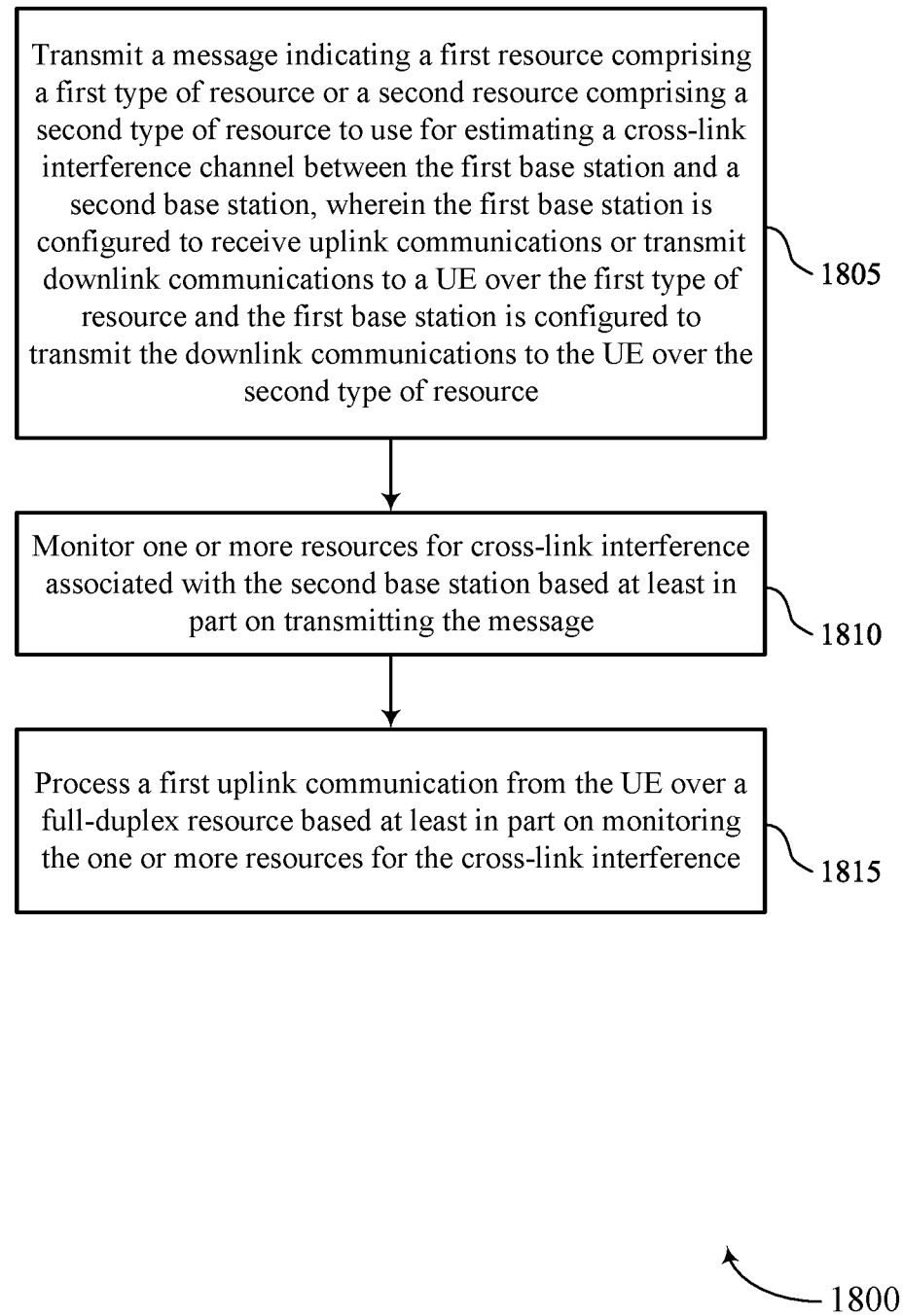

FIG. 18 shows a flowchart illustrating a method 1800 that supports signaling for inter-base station interference estimation in accordance with aspects of the present disclosure. The operations of the method 1800 may be implemented by a base station or its components as described herein. For example, the operations of the method 1800 may be performed by a base station 105 as described with reference to FIGS. 1 through 5 and 10 through 13. In some examples, a base station may execute a set of instructions to control the functional elements of the base station to perform the described functions. Additionally, or alternatively, the base station may perform aspects of the described functions using special-purpose hardware.

At 1805, the method may include transmitting a message indicating a first resource including a first type of resource or a second resource including a second type of resource to use for estimating a CLI channel between the first base station and a second base station, where the first base station is configured to receive uplink communications or transmit downlink communications to a UE over the first type of resource and the first base station is configured to transmit the downlink communications to the UE over the second type of resource. The operations of 1805 may be performed in accordance with examples as disclosed herein. In some examples, aspects of the operations of 1805 may be performed by a messaging manager 1225 as described with reference to FIG. 12.

At 1810, the method may include monitoring one or more resources for CLI associated with the second base station based on transmitting the message. The operations of 1810 may be performed in accordance with examples as disclosed herein. In some examples, aspects of the operations of 1810 may be performed by an interference manager 1230 as described with reference to FIG. 12.

At 1815, the method may include processing a first uplink communication from the UE over a full-duplex resource based on monitoring the one or more resources for the CLI. The operations of 1815 may be performed in accordance with examples as disclosed herein. In some examples, aspects of the operations of 1815 may be performed by an interference manager 1230 as described with reference to FIG. 12.

The following provides an overview of aspects of the present disclosure:

Aspect 1: A method for wireless communication at a UE, comprising: receiving, from a first base station, a message that indicates one or more communication patterns of one or more resources for estimating a CLI channel between uplink communications associated with the first base station and downlink communications associated with a second base station; adjusting a transmission parameter for an uplink communication based at least in part on receiving the message from the first base station; and transmitting the uplink communication over the one or more resources based at least in part on adjusting the transmission parameter.

Aspect 2: The method of aspect 1, further comprising: receiving, from the first base station, a second message to activate a communication pattern of the one or more communication patterns, wherein adjusting a transmission parameter for the uplink communication is based at least in part on receiving the second message.

Aspect 3: The method of aspect 2, wherein the message comprises a radio resource control message; and the second message comprises a medium access control-control element or downlink control information.

Aspect 4: The method of any of aspects 1 through 3, wherein adjusting the transmission parameter for the uplink communication further comprises: reducing the transmit power of the uplink communications during at least a portion of the one or more resources.

Aspect 5: The method of aspect 4, wherein reducing the transmit power of the uplink communications further comprises: reducing the transmit power of the uplink communications to zero during the portion of the one or more resources.

Aspect 6: The method of any of aspects 1 through 5, further comprising: identifying a first subband of a BWP for estimating the CLI channel, a second subband of the BWP for a second uplink communication by the UE, and a third subband of the BWP as a guard band between the first subband and the second subband based at least in part on receiving the message, the one or more resources comprising the BWP, wherein the one or more communication patterns included in the message indicate the first subband, the second subband, and the third subband, wherein adjusting a transmission parameter for the uplink communication is based at least in part on the identifying.

Aspect 7: The method of aspect 6, further comprising: transmitting, over the second subband, the uplink communication to the first base station based at least in part on transmitting the message.

Aspect 8: The method of any of aspects 1 through 7, further comprising: identifying a hopping pattern of subbands of a BWP for estimating the CLI channel and transmitting the uplink communications based at least in part on receiving the message, the hopping pattern spanning a plurality of slots, wherein the one or more communication patterns indicate the hopping pattern, wherein adjusting a transmission parameter for the uplink communication is based at least in part on the identifying.

Aspect 9: The method of aspect 8, wherein the hopping pattern indicates at least one time resource for each subband of the subbands of the BWP for estimating the CLI channel.

Aspect 10: The method of any of aspects 1 through 9, wherein adjusting the transmission parameter for the uplink communication further comprises: applying a TA for the uplink communication transmitted by the UE during a first time resource of the one or more resources based at least in part on receiving the message, the TA based at least in part on a propagation delay of a downlink communication transmitted by the second base station.

Aspect 11: The method of aspect 10, wherein the TA is based at least in part on a capability of the UE.

Aspect 12: The method of any of aspects 1 through 11, wherein adjusting the transmission parameter for the uplink communication further comprises: identifying one or more beams to restrict the UE from using to transmit the uplink communication during the one or more resources, wherein the message indicates the one or more beams.

Aspect 13: The method of aspect 12, further comprising: receiving, from the first base station, a second message that schedules the UE with the uplink communication using the one or more beams; and determining to skip the uplink communication or use a different beam than the one or more beams based at least in part on the one or more communication patterns.

Aspect 14: The method of any of aspects 1 through 13, further comprising: identifying one or more subbands of frequency resources or one or more slots of time resources or both for estimating the CLI channel, wherein the message includes an indication of the one or more subbands or the one or more slots.

Aspect 15: The method of any of aspects 1 through 14, wherein the one or more resources comprise one or more subbands of frequency resources and one or more slots of time resources.

Aspect 16: The method of any of aspects 1 through 15, wherein the one or more communication patterns indicate to the UE to mute or reduce a transmit power of one or more uplink communications during a set of time resources of the one or more resources.

Aspect 17: The method of any of aspects 1 through 16, wherein the one or more communication patterns indicate a set of beams that the UE is restricted from using for the uplink communications.

Aspect 18: The method of any of aspects 1 through 17, wherein the one or more communication patterns indicate one or more ports for estimating the CLI channel.

Aspect 19: The method of any of aspects 1 through 18, wherein the first base station is configured to receive the uplink communications over the one or more resources; the second base station is configured to transmit the downlink communications over the one or more resources.

Aspect 20: A method for wireless communication at a first base station, comprising: transmitting, to a UE, a message that indicates one or more communication patterns of one or more resources for estimating a CLI channel between the first base station and a second base station, the first base station configured to receive uplink communications over the one or more resources; monitoring the one or more resources for CLI associated with the second base station based at least in part on transmitting the message; and processing a first uplink communication from the UE communicated over a resource full duplexed with one or more downlink communications associated with the second base station based at least in part on monitoring the one or more resources for the CLI.

Aspect 21: The method of aspect 20, further comprising: transmitting a second message to activate a communication pattern of the one or more communication patterns, wherein monitoring the one or more resources for the CLI is based at least in part on transmitting the second message.

Aspect 22: The method of aspect 21, wherein the message comprises a radio resource control message; and the second message comprises a medium access control-control element or downlink control information.

Aspect 23: The method of any of aspects 20 through 22, further comprising: identifying one or more UEs to mute the uplink communications during at least a portion of the one or more resources, the one or more UEs comprising the first UE, wherein transmitting the message is based at least in part on identifying the one or more UEs.

Aspect 24: The method of any of aspects 20 through 23, further comprising: identifying one or more UEs to reduce a transmit power of the uplink communications during at least a portion of the one or more resources, the one or more UEs comprising the first UE, wherein transmitting the message is based at least in part on identifying the one or more UEs.

Aspect 25: The method of any of aspects 20 through 24, further comprising: identifying one or more subbands of frequency resources or one or more slots of time resources or both for estimating the CLI channel, wherein the message includes an indication of the one or more subbands or the one or more slots.

Aspect 26: The method of any of aspects 20 through 25, wherein the one or more resources comprise one or more subbands of frequency resources and one or more slots of time resources.

Aspect 27: The method of any of aspects 20 through 26, wherein the one or more communication patterns indicate to the UE to mute or reduce a transmit power of one or more uplink communications during a set of time resources of the one or more resources.

Aspect 28: The method of any of aspects 20 through 27, further comprising: identifying a first subband of a BWP for estimating the CLI channel, a second subband of the BWP for an uplink communication by the UE, and a third subband of the BWP as a guard band between the first subband and the second subband, the one or more resources comprising the BWP, wherein the one or more communication patterns included in the message indicate the first subband, the second subband, and the third subband.

Aspect 29: The method of aspect 28, wherein monitoring the one or more resources further comprises monitoring the first subband of the BWP for the CLI.

Aspect 30: The method of any of aspects 28 through 29, further comprising: receiving, over the second subband, the uplink communication from the UE based at least in part on transmitting the message.

Aspect 31: The method of any of aspects 20 through 30, further comprising: identifying a hopping pattern of subbands of a BWP for estimating the CLI channel and receiving the uplink communications, the hopping pattern spanning a plurality of slots, wherein the one or more communication patterns indicate the hopping pattern.

Aspect 32: The method of aspect 31, wherein the hopping pattern indicates at least one time resource for each subband of the subbands of the BWP for estimating the CLI channel.

Aspect 33: The method of any of aspects 20 through 32, further comprising: identifying a TA for an uplink communication communicated by the UE during the one or more resources, the TA based at least in part on a propagation delay of a downlink communication transmitted by the second base station; and transmitting, to the UE, a second message that comprises the TA, wherein the monitoring is based at least in part on transmitting the second message.

Aspect 34: The method of aspect 33, wherein the TA is based at least in part on a capability of the UE.

Aspect 35: The method of any of aspects 20 through 34, further comprising: identifying one or more beams to restrict the UE from using to transmit the uplink communications during the one or more resources, wherein the message indicates the one or more beams.

Aspect 36: The method of any of aspects 20 through 35, wherein the one or more communication patterns indicate to the UE a set of beams that the UE is restricted from using for the uplink communications.

Aspect 37: The method of any of aspects 20 through 36, further comprising: identifying a first quantity of reference signals transmitted by the second base station; and identifying a second quantity of ports for estimating the CLI channel based at least in part on identifying the first quantity of reference signals, wherein the one or more communication patterns are based at least in part on identifying the second quantity of ports.

Aspect 38: The method of any of aspects 20 through 37, wherein the second base station is configured to transmit downlink communications over the one or more resources.

Aspect 39: A method for wireless communication at a first base station, comprising: transmitting a message indicating a first resource comprising a first type of resource or a second resource comprising a second type of resource to use for estimating a CLI channel between the first base station and a second base station, wherein the first base station is configured to receive uplink communications or transmit downlink communications to a UE over the first type of resource and the first base station is configured to transmit the downlink communications to the UE over the second type of resource; monitoring one or more resources for CLI associated with the second base station based at least in part on transmitting the message; and processing a first uplink communication from the UE over a full-duplex resource based at least in part on monitoring the one or more resources for the CLI.

Aspect 40: The method of aspect 39, further comprising: transmitting, to the UE, a second message to convert the first type of resource to the second type of resource, wherein monitoring the one or more resources for the CLI is based at least in part on transmitting the message.

Aspect 41: The method of aspect 40, wherein the second message comprises a slot format indicator configured to convert the first resource comprising the first type of resource to be the second type of resource.

Aspect 42: The method of any of aspects 39 through 41, wherein the first type of resource comprises a flexible symbol configured to use with the uplink communications or the downlink communications; and the second type of resource comprises a downlink symbol.

Aspect 43: An apparatus for wireless communication at a UE, comprising a memory; and a processor coupled to the memory and configured to cause the apparatus to perform a method of any of aspects 1 through 19.

Aspect 44: An apparatus for wireless communication at a UE, comprising at least one means for performing a method of any of aspects 1 through 19.

Aspect 45: A non-transitory computer-readable medium storing code for wireless communication at a UE, the code comprising instructions executable by a processor to perform a method of any of aspects 1 through 19.

Aspect 46: An apparatus for wireless communication at a first base station, comprising a memory; and a processor coupled to the memory and configured to cause the apparatus to perform a method of any of aspects 20 through 38.

Aspect 47: An apparatus for wireless communication at a first base station, comprising at least one means for performing a method of any of aspects 20 through 38.

Aspect 48: A non-transitory computer-readable medium storing code for wireless communication at a first base station, the code comprising instructions executable by a processor to perform a method of any of aspects 20 through 38.

Aspect 49: An apparatus for wireless communication at a first base station, comprising a memory; and a processor coupled to the memory and configured to cause the apparatus to cause the apparatus to perform a method of any of aspects 39 through 42.

Aspect 50: An apparatus for wireless communication at a first base station, comprising at least one means for performing a method of any of aspects 39 through 42.

Aspect 51: A non-transitory computer-readable medium storing code for wireless communication at a first base station, the code comprising instructions executable by a processor to perform a method of any of aspects 39 through 42.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium.

Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   a memory; and
   a processor coupled to the memory and configured to cause the apparatus to:
   receive, from a first base station, a message that indicates one or more communication patterns of one or more resources for estimating a cross-link interference channel between uplink communications associated with the first base station and downlink communications associated with a second base station;
   adjust a transmission parameter for an uplink communication based at least in part on receiving the message from the first base station; and
   transmit the uplink communication over the one or more resources based at least in part on adjusting the transmission parameter.

2. The apparatus of claim 1, wherein the processor is further configured to cause the apparatus to:
   receive, from the first base station, a second message to activate a communication pattern of the one or more communication patterns, wherein adjusting the transmission parameter for the uplink communication is based at least in part on receiving the second message.

3. The apparatus of claim 2, wherein:
   the message comprises a radio resource control message; and
   the second message comprises a medium access control-control element or downlink control information.

4. The apparatus of claim 1, wherein the processor configured to adjust the transmission parameter for the uplink communication is further configured to cause the apparatus to:
   reduce a transmit power of the uplink communications during at least a portion of the one or more resources.

5. The apparatus of claim 4, wherein the processor configured to reduce the transmit power of the uplink communications is further configured to cause the apparatus to:
   reduce the transmit power of the uplink communications to zero during the portion of the one or more resources.

6. The apparatus of claim 1, wherein the processor is further configured to cause the apparatus to:
   identify a first subband of a bandwidth part for estimating the cross-link interference channel, a second subband of the bandwidth part for a second uplink communication by the UE, and a third subband of the bandwidth part as a guard band between the first subband and the second subband based at least in part on receiving the message, the one or more resources comprising the bandwidth part, wherein the one or more communication patterns included in the message indicate the first subband, the second subband, and the third subband, wherein adjusting the transmission parameter for the uplink communication is based at least in part on the identifying.

7. The apparatus of claim 6, wherein the processor is further configured to cause the apparatus to:
   transmit, over the second subband, the uplink communication to the first base station based at least in part on receiving the message.

8. The apparatus of claim 1, wherein the processor is further configured to cause the apparatus to:
   identify a hopping pattern of subbands of a bandwidth part for estimating the cross-link interference channel and transmitting the uplink communications based at least in part on receiving the message, the hopping pattern spanning a plurality of slots, wherein the one or more communication patterns indicate the hopping pattern, wherein adjusting the transmission parameter for the uplink communication is based at least in part on the identifying.

9. The apparatus of claim 8, wherein the hopping pattern indicates at least one time resource for each subband of the subbands of the bandwidth part for estimating the cross-link interference channel.

10. The apparatus of claim 1, wherein the processor configured to adjust the transmission parameter for the uplink communication is further configured to cause the apparatus to:
apply a timing advance for the uplink communication transmitted by the UE during a first time resource of the one or more resources based at least in part on receiving the message, the timing advance based at least in part on a propagation delay of a downlink communication transmitted by the second base station.

11. The apparatus of claim 1, wherein the processor configured to adjust the transmission parameter for the uplink communication is further configured to cause the apparatus to:
identify one or more beams to restrict the UE from using to transmit the uplink communication during the one or more resources, wherein the message indicates the one or more beams.

12. The apparatus of claim 11, wherein the processor is further configured to cause the apparatus to:
receive, from the first base station, a second message that schedules the UE with the uplink communication using the one or more beams; and
determine to skip the uplink communication or use a different beam than the one or more beams based at least in part on the one or more communication patterns.

13. The apparatus of claim 1, wherein the processor is further configured to cause the apparatus to:
identify one or more subbands of frequency resources or one or more slots of time resources or both for estimating the cross-link interference channel, wherein the message includes an indication of the one or more subbands or the one or more slots.

14. The apparatus of claim 1, wherein:
the one or more resources comprise one or more subbands of frequency resources and one or more slots of time resources; and
the one or more communication patterns indicate to the UE to mute or reduce a transmit power of one or more uplink communications during a set of time resources of the one or more resources.

15. The apparatus of claim 1, wherein the one or more communication patterns indicate one or more ports for estimating the cross-link interference channel.

16. The apparatus of claim 1, wherein:
the first base station is configured to receive the uplink communications over the one or more resources; and
the second base station is configured to transmit the downlink communications over the one or more resources.

17. An apparatus for wireless communication at a first base station, comprising:
a memory; and
a processor coupled to the memory and configured to cause the apparatus to:
transmit, to a user equipment (UE), a message that indicates one or more communication patterns of one or more resources for estimating a cross-link interference channel between the first base station and a second base station, the first base station configured to receive uplink communications over the one or more resources;
monitor the one or more resources for cross-link interference associated with the second base station based at least in part on transmitting the message; and
process an uplink communication from the UE communicated over a resource full duplexed with one or more downlink communications associated with the second base station based at least in part on monitoring the one or more resources for the cross-link interference.

18. The apparatus of claim 17, wherein the processor is further configured to cause the apparatus to:
transmit a second message to activate a communication pattern of the one or more communication patterns, wherein monitoring the one or more resources for the cross-link interference is based at least in part on transmitting the second message, wherein the message comprises a radio resource control message and the second message comprises a medium access control-control element or downlink control information.

19. The apparatus of claim 17, wherein the processor is further configured to cause the apparatus to:
identify one or more UEs to mute the uplink communications during at least a portion of the one or more resources, the one or more UEs comprising the UE, wherein transmitting the message is based at least in part on identifying the one or more UEs.

20. The apparatus of claim 17, wherein the processor is further configured to cause the apparatus to:
identify one or more subbands of frequency resources or one or more slots of time resources or both for estimating the cross-link interference channel, wherein the message includes an indication of the one or more subbands or the one or more slots.

21. The apparatus of claim 17, wherein the processor is further configured to cause the apparatus to:
identify a first subband of a bandwidth part for estimating the cross-link interference channel, a second subband of the bandwidth part for the uplink communication by the UE, and a third subband of the bandwidth part as a guard band between the first subband and the second subband, the one or more resources comprising the bandwidth part, wherein the one or more communication patterns included in the message indicate the first subband, the second subband, and the third subband.

22. The apparatus of claim 21, wherein the processor configured to monitor the one or more resources further comprises the processor configured to cause the apparatus to monitor the first subband of the bandwidth part for the cross-link interference.

23. The apparatus of claim 21, wherein the processor is further configured to cause the apparatus to:
receive, over the second subband, the uplink communication from the UE based at least in part on transmitting the message.

24. The apparatus of claim 17, wherein the processor is further configured to cause the apparatus to:
identify a hopping pattern of subbands of a bandwidth part for estimating the cross-link interference channel and receiving the uplink communications, the hopping pattern spanning a plurality of slots, wherein the one or more communication patterns indicate the hopping pattern, wherein the hopping pattern indicates at least one time resource for each subband of the subbands of the bandwidth part for estimating the cross-link interference channel.

25. The apparatus of claim 17, wherein the processor is further configured to cause the apparatus to:

identify a timing advance for the uplink communication communicated by the UE during the one or more resources, the timing advance based at least in part on a propagation delay of a downlink communication transmitted by the second base station; and transmit, to the UE, a second message that comprises the timing advance, wherein the monitoring is based at least in part on transmitting the second message, wherein the timing advance is based at least in part on a capability of the UE.

26. The apparatus of claim 17, wherein the processor is further configured to cause the apparatus to:

identify one or more beams to restrict the UE from using to transmit the uplink communications during the one or more resources, wherein the message indicates the one or more beams.

27. An apparatus for wireless communication at a first base station, comprising:

a memory; and a processor coupled to the memory and configured to cause the apparatus to:

transmit a message indicating a first resource comprising a first type of resource or a second resource comprising a second type of resource to use for estimating a cross-link interference channel between the first base station and a second base station, wherein the first base station is configured to receive uplink communications or transmit downlink communications to a user equipment (UE) over the first type of resource and the first base station is configured to transmit the downlink communications to the UE over the second type of resource;

monitor one or more resources for cross-link interference associated with the second base station based at least in part on transmitting the message; and process an uplink communication from the UE over a full-duplex resource based at least in part on monitoring the one or more resources for the cross-link interference.

28. The apparatus of claim 27, wherein the processor is further configured to cause the apparatus to:

transmit, to the UE, a second message to convert the first type of resource to the second type of resource, wherein monitoring the one or more resources for the cross-link interference is based at least in part on transmitting the message, wherein the second message comprises a slot format indicator configured to convert the first resource comprising the first type of resource to be the second type of resource.

29. The apparatus of claim 27, wherein:

the first type of resource comprises a flexible symbol configured to use with the uplink communications or the downlink communications; and the second type of resource comprises a downlink symbol.

30. A method for wireless communication at a user equipment (UE), comprising:

receiving, from a first base station, a message that indicates one or more communication patterns of one or more resources for estimating a cross-link interference channel between uplink communications associated with the first base station and downlink communications associated with a second base station;

adjusting a transmission parameter for an uplink communication based at least in part on receiving the message from the first base station; and transmitting the uplink communication over the one or more resources based at least in part on adjusting the transmission parameter.

* * * * *